(12) United States Patent
Muntz

(10) Patent No.: US 11,394,649 B2
(45) Date of Patent: Jul. 19, 2022

(54) NON-RANDOM FLOWLET-BASED ROUTING

(71) Applicant: Intel Corporation, Santa Clara, CA (US)

(72) Inventor: Gary Muntz, Lexington, MA (US)

(73) Assignee: Intel Corporation, Santa Clara, CA (US)

(*) Notice: Subject to any disclaimer, the term of this patent is extended or adjusted under 35 U.S.C. 154(b) by 873 days.

(21) Appl. No.: 16/022,836

(22) Filed: Jun. 29, 2018

(65) Prior Publication Data

US 2019/0052567 A1 Feb. 14, 2019

(51) Int. Cl.
*H04L 47/122* (2022.01)
*H04L 49/00* (2022.01)
*H04L 47/2441* (2022.01)
*H04L 69/16* (2022.01)
*H04L 47/125* (2022.01)
*H04L 45/24* (2022.01)
*H04L 67/10* (2022.01)
*H04L 69/40* (2022.01)
*H04L 67/101* (2022.01)
*H04L 69/22* (2022.01)

(52) U.S. Cl.
CPC .......... *H04L 47/122* (2013.01); *H04L 45/24* (2013.01); *H04L 47/125* (2013.01); *H04L 47/2441* (2013.01); *H04L 49/30* (2013.01); *H04L 67/10* (2013.01); *H04L 67/101* (2013.01); *H04L 69/16* (2013.01); *H04L 69/22* (2013.01); *H04L 69/40* (2013.01)

(58) Field of Classification Search
CPC ....... H04L 47/122; H04L 67/10; H04L 69/40; H04L 67/101; H04L 69/22; H04L 49/30; H04L 47/2441; H04L 69/16; H04L 47/125; H04L 45/24; H04L 49/70; H04L 45/123

See application file for complete search history.

(56) References Cited

U.S. PATENT DOCUMENTS

| | | | |
|---|---|---|---|
| 10,218,629 B1* | 2/2019 | An ..................... | H04L 45/22 |
| 2004/0109418 A1* | 6/2004 | Fedorkow .............. | H04L 43/10 370/251 |
| 2015/0127797 A1* | 5/2015 | Attar ...................... | H04L 45/38 709/223 |
| 2016/0026742 A1* | 1/2016 | Schelle .................. | G06F 30/34 711/104 |
| 2017/0085485 A1* | 3/2017 | Vanini ................... | H04L 47/762 |
| 2017/0324664 A1* | 11/2017 | Xu ......................... | H04L 45/245 |

(Continued)

OTHER PUBLICATIONS

"Joint Virtual Switch Deployment and Routing for Load Balancing in SDNs"; IEEE Journal on Selected Areas in Communications, vol. 36, No. 3, Mar. 2018; Yang et al. (Year: 2018).*

(Continued)

*Primary Examiner* — Benjamin H Elliott, IV
(74) *Attorney, Agent, or Firm* — Compass IP Law PC

(57) ABSTRACT

There is disclosed in one example a network switch, including an ingress port and a plurality of egress ports to provide a plurality of paths for a packet; a switching circuit to provide network switching; circuitry to identify the start of a flowlet; circuitry to select a non-random path for the flowlet; circuitry to latch the selected path for the flowlet; and a load balancer to receive a packet, match the packet to the flowlet, and direct the packet to the selected path.

24 Claims, 12 Drawing Sheets

(56) References Cited

U.S. PATENT DOCUMENTS

2018/0139138 A1* 5/2018 Vanini .................... H04L 45/24
2019/0052567 A1* 2/2019 Muntz .................. H04L 67/101
2019/0058663 A1* 2/2019 Song ...................... H04L 47/26
2019/0363989 A1* 11/2019 Shalev ................. G06F 9/5005

OTHER PUBLICATIONS

Vanini et al., "Let It Flow : Resilient Asymmetric Load Balancing with Flowlet Switching", Proceedings of the 14th USENIX Symposium on Networked Systems Design and Implementation (NSDI '17)., Mar. 27-29, 2017, Boston, MA, pp. 406-420.

Yafan, "Adaptive Flowlet Splicing—VCF's Fine-Granied Adaptive Load Balancing Without Packet Reordering", Jul. 31, 2014, 11 pages, retrieved from the internet on Jun. 15, 2018, https://forums.juniper.net/t5/Archive/Adaptive-Flowlet-Splicing-VCF-s-Fine-Grained-Adaptive-Load/ba-p/251674.

* cited by examiner

NON-RANDOM FLOWLET-BASED ROUTING

FIELD OF THE SPECIFICATION

This disclosure relates in general to the field of network computing, and more particularly, though not exclusively, to a system and method for providing non-random flowlet-based routing.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
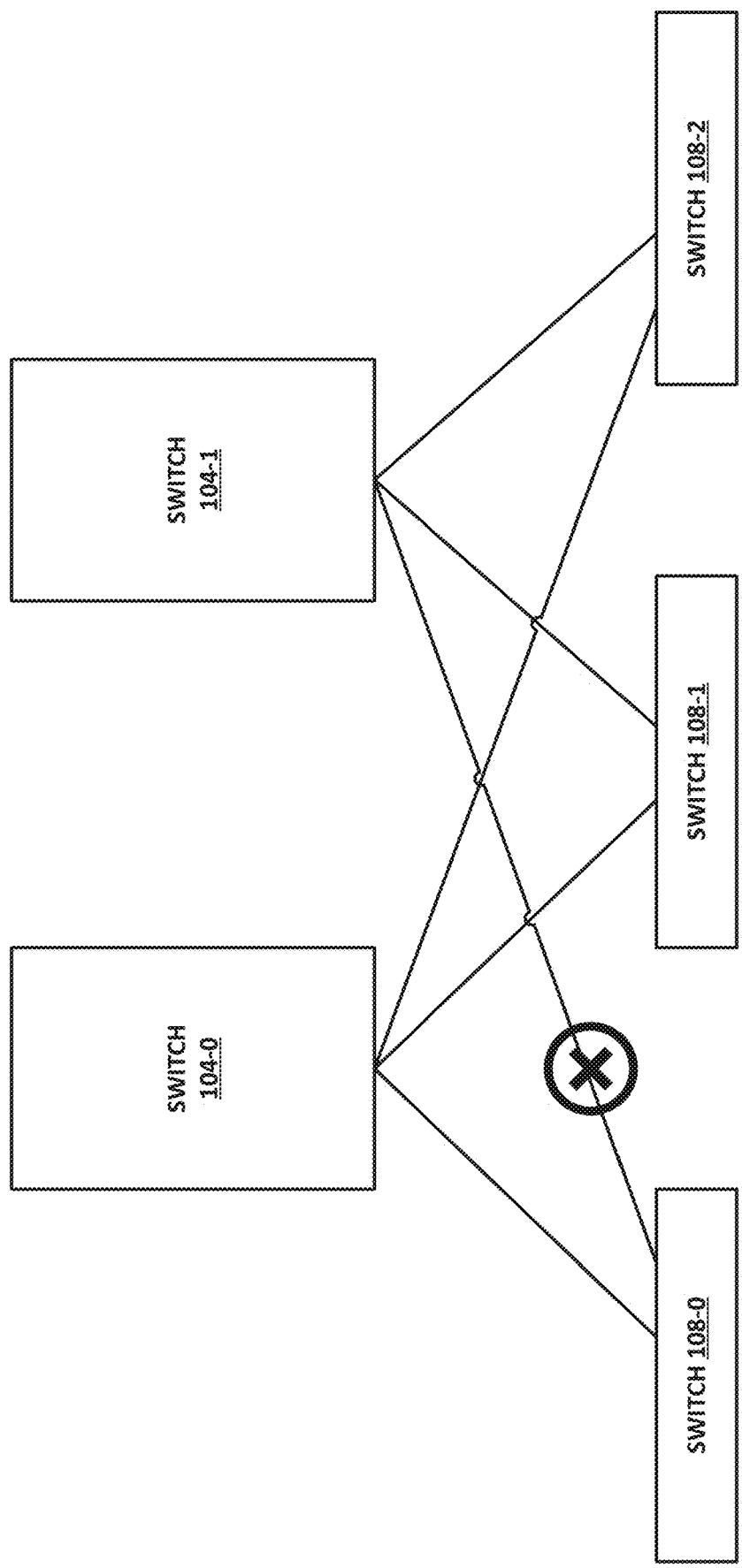
FIGS. 1 and 2 are block diagrams of network topologies illustrating a connection failure and a link failure, respectively, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In embodiments of the present disclosure, a VM is an isolated partition within a computing device that allows usage of an operating system and other applications, independent of other programs on the device in which it is contained. VMs, containers, and similar may be generically referred to as "guest" systems.

As used in this specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

In a large-scale network topology such as a data center network or a high-performance computing (HPC) fabric, a packet may traverse one of many available paths to ultimately arrive at its endpoint destination. In various network topologies, a packet starts at a first hop switch, which may be directly or nearly directly coupled to the endpoint device. However, the first hop switch may then load balance packets out to a plurality of intermediate switches, which themselves may cascade load balancing out to other intermediate switches. Ultimately, these various paths will converge down to a last hop switch or router, which finally directs packets to a recipient endpoint.

Many load balancing algorithms have been used to make decisions at the various switch levels of which path to direct a packet to. In general, a switch may have one or more ingress ports on which incoming packets are received, and a plurality of output ports to which the packet can be directed, with the output ports representing different network paths. Furthermore, each path at a particular level could cascade out into a plurality of alternate paths from there.

Switches within a data center or HPC fabric may perform their load balancing according to factors that are at a premium for the particular application.

For example, in an HPC fabric, fine grained adaptive routing (FGAR) may be desirable in an HPC fabric. FGAR performs fast calculations of the congestion on each possible link, and selects a least congested link as the path for an incoming packet. FGAR seeks to optimize the routing for each individual packet, with little respect for ordering. In HPC applications, out of order packets are generally not considered to be a substantial issue, as packets can be reordered at the endpoint, or processed out of order depending on the application.

But in a network data center, FGAR alone may not be an optimal solution. In a data center using a protocol such as transmission control protocol (TCP) or user datagram protocol (UDP), the supported protocols are much less tolerant of out of order processing. The nature of these protocols is such that an occasional out of order packet may be able to be corrected or compensated for, but too many out of order packets can result in disruption of the communication caused by dropped packets or by re-transmissions when flows fail parity checks. Out-of-order packets may also cause added latency, consumption of compute resources in a software driver, and consequent limits on the available throughput on a node. Any or all of these can cause substantial costs from the end-user's point of view, and thus impact the profitability of a data center.

Thus, a solution such as FGAR, while it seeks to identify the optimal route for an individual packet, may in fact result in higher congestion in a TCP-based fabric, because it results in a large number of re-transmissions. A relatively new approach to load balancing flows in a data center in which reordering is relatively not tolerable is the "LetFlow" algorithm. For example, an academic paper published in 2017 describes a LetFlow algorithm.

LetFlow seeks to solve the problem of asymmetry in network fabrics by identifying "flowlets" which are arbitrarily-sized subdivisions of flows. A flowlet may be characterized in one embodiment as a burst of packets of a given flow, wherein the packets of the flowlet are sufficiently close together that they should be directed along the same path to avoid packet reordering. Once a path is identified for a flowlet, all packets within the flowlet that are directed along that path without further inspection of the congestion along that path. These flowlets have a somewhat elastic property in that, if the path selected is a congested path, then fewer packets will be able to flow along the path in the fixed lifespan of the flowlet. Thus, to some degree, flowlets in the LetFlow algorithm are self-adapting as congestion along certain links naturally reduces the size of the flowlet. The original LetFlow publication relies on randomly selecting a path for each flowlet without inspecting the congestion along that path, on the assumption that congestion will self adapt.

A flowlet is described as a simple load balancing protocol that can be implemented directly in the switching hardware. The switch picks an outgoing port at random among available ports for each flowlet. The decision is made on the first packet of the flowlet, and later packets in the same flowlet follow the same path as long as the flowlet remains active.

For flowlet detection, the LetFlow algorithm uses a flowlet table (which may be or may be part or a subset of a larger flow table, and which may also be or include an egress port table that maps flows to their designated egress ports). Entries in the table include a port number, a valid bit, and an age bit. When a packet arrives, its 5-tuple header (comprising, e.g., source port, source IP, destination port, destination IP, and protocol) may be hashed against an index for accessing an entry in the flowlet table. If the entry is active (e.g., if the valid bit is set), then the packet is sent to the port stored in the flowlet table entry. If the entry is invalid (e.g., the valid bit is cleared), the load balancer identifies a new flowlet, randomly picks a port from the available choices, and forwards the packet to that port. The load balancer sets the valid bit to 1, clears the age bit, and records the chosen port in the table.

After a fixed time interval A, a separate hardware thread checks the age bit of each flowlet table entry. If the age bit is not already set, the checker sets the age bit to 1 and proceeds. If the age bit is already set, the checker ages out the entry by clearing the valid bit and clearing the age bit. Any later packets that hash to the previous entry are detected as a new flowlet.

This LetFlow algorithm provides a 1-bit aging mechanism, thus enabling the detection of flowlets without maintaining separate timestamps for each flow. Rather, the clock of the switch itself acts as a timestamp, with the age bit being set or cleared at regular intervals. As described above, if the randomly selected path for a flowlet is congested, then the switch will not be able to direct as many packets along that path. Those packets will rather accumulate in the ingress queue of the switch. When the switch identifies the next flowlet, it will again randomly select a path, under the assumption that eventually it will select a relatively uncrowded path at random. This example is, however, nonlimiting. Other embodiments may use an age counter, such as a countup or countdown timer.

This LetFlow algorithm does provide some advantages for hardware implementations, particularly in large switch application-specific integrated circuits (ASICs), including local and small state overhead and a highly simplified random decision circuit. LetFlow also generates minimal reordering of packets, as desired in many important network protocols such as TCP.

But LetFlow is deliberately blind to the congestion state of the paths that it selects. In a network that experiences significant congestion, LetFlow may actually exacerbate the congestion as flows that have been using uncongested paths become randomly redistributed into congested paths. At a minimum, LetFlow clears congestion only randomly and by sheer luck.

However, as described above, other load balancing solutions face their own challenges. Many rely on endpoints to manage the whole network, which is a slow and complex computation based on inherently stale state information. Thus, some switches provide their own fine grained adaptive routing (FGAR) in hardware as a swift and effective mechanism for detecting congestion on outbound links and selecting a least congested outbound link. But as described above, FGAR, which operates on a packet-by-packet basis, can result in substantial reordering, which is undesirable for many key protocols such as those used in cloud or other data centers.

The present specification describes a network switch with a localized load balancing capability with hybrid properties that realizes the deliberate congestion avoidance of FGAR, while also realizing the minimal packet reordering of Let- Flow. Embodiments include, for example, a flowlet detector or delimiter that is configured to identify flowlets similar to the method used by LetFlow. But rather than directing these flowlets to deliberately random paths and trusting in the law of averages to eventually effectively load balance the network, the switch of the present specification uses an FGAR-like route inspection to find a least congested path and direct the flowlet to that path. The decision of that path is latched so that all packets within the flowlet continue to be directed to that path without further inspection of the congestion state of the path. Once a new flowlet is identified, the selection of a least congested path is repeated and that path is again latched for the duration of the flowlet.

This novel network fabric load balancing system and method realizes the advantages of both FGAR and LetFlow, thus resulting in overall less congested networks with minimal reordering.

A system and method for non-random flowlet-based routing will now be described with more particular reference to the attached FIGURES It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 2:
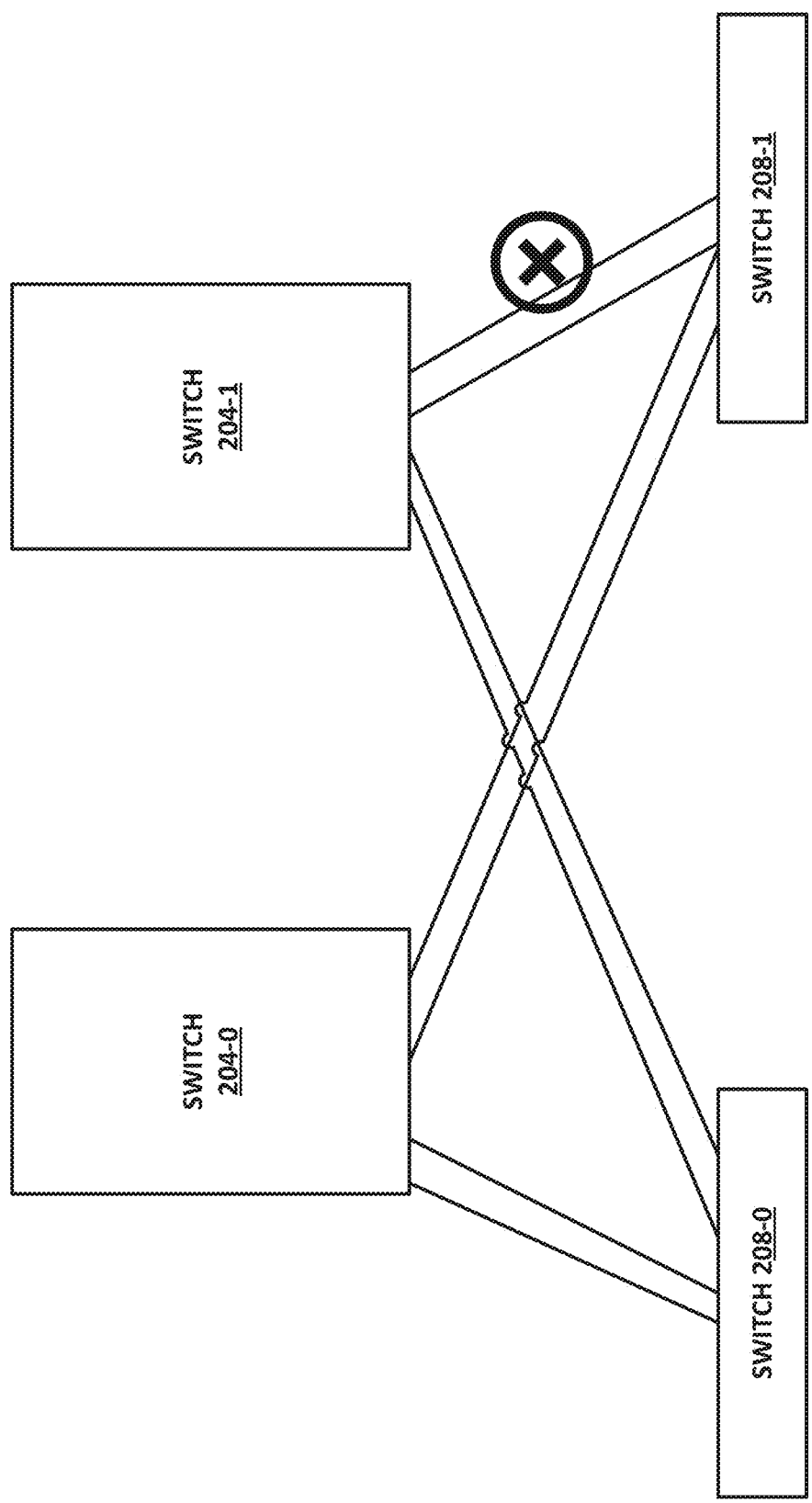

FIGS. 1 and 2 are block diagrams of network topologies illustrating a connection failure and a link failure, respectively, according to one or more examples of the present specification. Link failure is illustrated here as an illustrative (though non-exclusive driver) of asymmetry and/or congestion within a network. Other drivers can include, by way of nonlimiting example, traffic patterns, bottlenecks (e.g., virtual functions that become congested), and device failures.

FIGS. 1 and 2 illustrate the problem of asymmetry in network topologies. In an ideal network, links would never fail, and all traffic would be evenly distributed among available links without suffering any reordering. In the real world, links fail, become congested, or otherwise suffer less than ideal conditions. This is illustrated in FIGS. 1 and 2.

In the example of FIG. 1, two switches, namely switch 104-0 and switch 104-1 are servicing three additional switches, namely switch 108-0, switch 108-1, and switch 108-2. These switches may be arranged as part of, for example, a multi-stage spine-leaf or "Clos" topology. Each switch 104 has one connection to each switch 108. Furthermore, packets may be directed to the various ingress ports of switches 104-0 and 104-1 as the result of upstream load balancing. In that case, a packet originating at an upstream source from switches 104-0 and 104-1 could ultimately traverse any one of six available paths at the egress ports of switches 104. Load balancing algorithms such as those disclosed in this specification and those used elsewhere are used to select a path from among the available paths.

However, as illustrated in FIG. 1, hardware fails. In this case, the link from switch 104-1 to switch 108-0 is broken. For example, an egress port of switch 104-1 may fail. Thus, the path from switch 104-1 to switch 108-0 is removed completely until switch 104-1 is replaced or serviced.

As illustrated in FIG. 2, aggregated connections can be used to ameliorate this eventuality. In this example, "link aggregation" may be provided, wherein a plurality of links are logically treated as a single link. In this case, switch 204-0 and switch 204-1 both include two routes each to switch 208-0 and switch 208-1. As illustrated in this case, one of the routes from switch 204-1 to switch 208-1 can fail, and connectivity to switch 208-1 can still be maintained. However, an asymmetry still results in this case. Although a link from switch 204-1 to switch 208-1 remains, this single link may become more congested than the links from switches 204 to links 208.

LetFlow is specifically intended to address the issue of asymmetry in network fabrics. In LetFlow, a flowlet is defined as a burst of packets of the same flow that are sufficiently temporally spaced that they can be sent along different paths with little danger or probability of reordering at the receiver. LetFlow sends each flowlet to one of the available alternate paths expressly randomly.

In contrast, FGAR operates on a per-packet basis, and selects a least congested link for each packet. While this is not random like LetFlow, and can result in great efficiency in directing individual packets, it can also result in substantial reordering.

Embodiments of the present specification realize the proven performance of FGAR in congestion avoidance along with the minimal reordering benefits of LetFlow. It is emphasized here that although the methods disclosed herein realize some of the advantages of both LetFlow and FGAR, this is not meant to imply that a switch designed according to the present specification is to implement either LetFlow or FGAR in their entirety. Indeed, LetFlow and FGAR as they presently exist are mutually exclusive. A switch may support one or the other (or both), but because LetFlow expressly requires random egress path assignments, they cannot be applied to the same flow.

Rather, a switch designed according to the present specification provides flowlet-based routing similar, though not necessarily identical to, that described in LetFlow, while selecting egress paths in a non-random fashion similar but not necessarily identical to FGAR. This results in a congestion aware, fine grained load balancing with minimal decision latency that is also compatible with protocols adverse to reordering. The end user of such a system sees high delivered bandwidth with relatively little vulnerability to congestion events, with a reduced latency tail. This operation is illustrated in FIG. 3.

Figure 3:
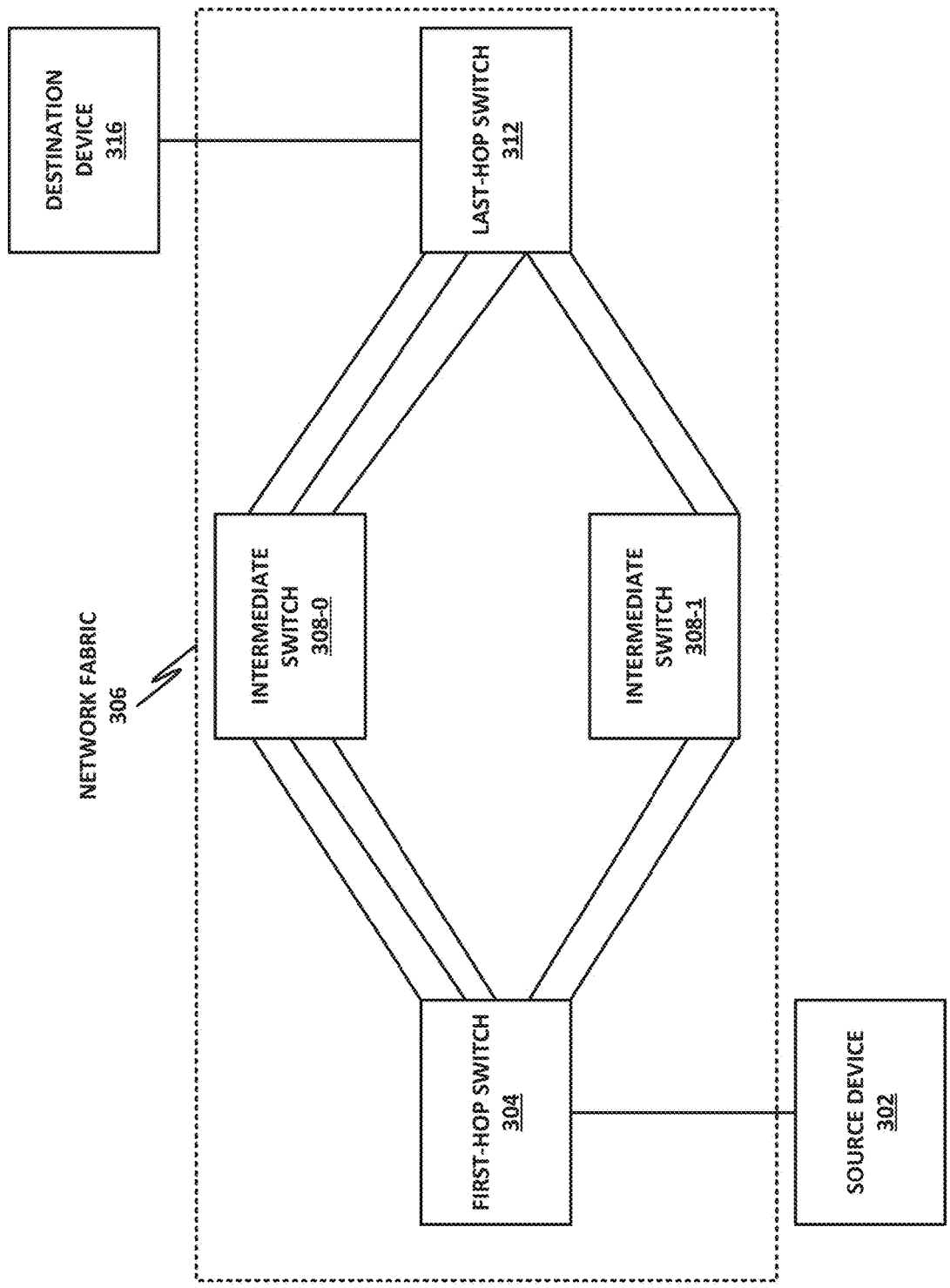
FIG. 3 is a block diagram of a network architecture illustrating the availability of a plurality of independent paths, according to one or more examples of the present specification.

FIG. 3 is a block diagram of a network architecture illustrating the availability of a plurality of independent paths, according to one or more examples of the present specification.

In FIG. 3, a source device 302 delivers a flow of packets to destination device 316. As those packets traverse network fabric 306, they may pass through a first hop switch 304, a plurality of intermediate switches 308, and a last hop switch 312 on their way to destination device 316.

In this case, first hop switch 304 has three paths to intermediate switch 308-0, which has three paths to last hop switch 312. On the other hand, first hop switch 304 has two paths to intermediate switch 308-1, and intermediate switch 308-1 has two paths to last hop switch 312. In practice, these various paths will not be equally congested. Thus, first hop switch 304 may have a load balancing circuit that enables it to select a path from among the five available paths to intermediate switch 308-0 and intermediate switch 308-1, collectively.

Intermediate switch 308-0 may also include a load balancer circuit to select from among its three available egress ports to last hop switch 312. Intermediate switch 308-1 may include a load balancing circuit to select between its two available egress ports to last hop switch 312.

Note that in the illustration, network fabric 306 involves only a small number of hops with a small number of available paths. While this may represent a real world use case for a smaller data center or enterprise network, in larger data centers, many more switches and paths may be available. However, the operations disclosed herein are equally applicable and scalable to such larger scale networks.

Note that network fabric 306 may be provided by a variety of protocols. For example, Intel® Omni-Path Architecture (OPA) is an HPC fabric with a protocol that tolerates packet reordering well. It also supports advanced topologies such as Megafly and Dragonfly that require hierarchical routing to perform well. In this environment, FGAR effectively provides congestion avoidance and load balancing.

However, not all fabrics support reordering as well as OPA and other HPC fabrics. Many data center protocols are adverse to reordering, and thus lend themselves to algorithms such as LetFlow that provide load balancing with minimal reordering. In some use cases, LetFlow provides near-elimination of reordering, and the occasional reordering that remains is sufficiently minimal to be tolerated by the endpoints.

However, algorithms such as LetFlow can be improved by providing non-random port selection such as is provided by FGAR. This provides congestion avoidance behavior that could replace the random path selection of LetFlow, thus enhancing the performance of load balancing algorithms in networks with congestion.

Figure 4:
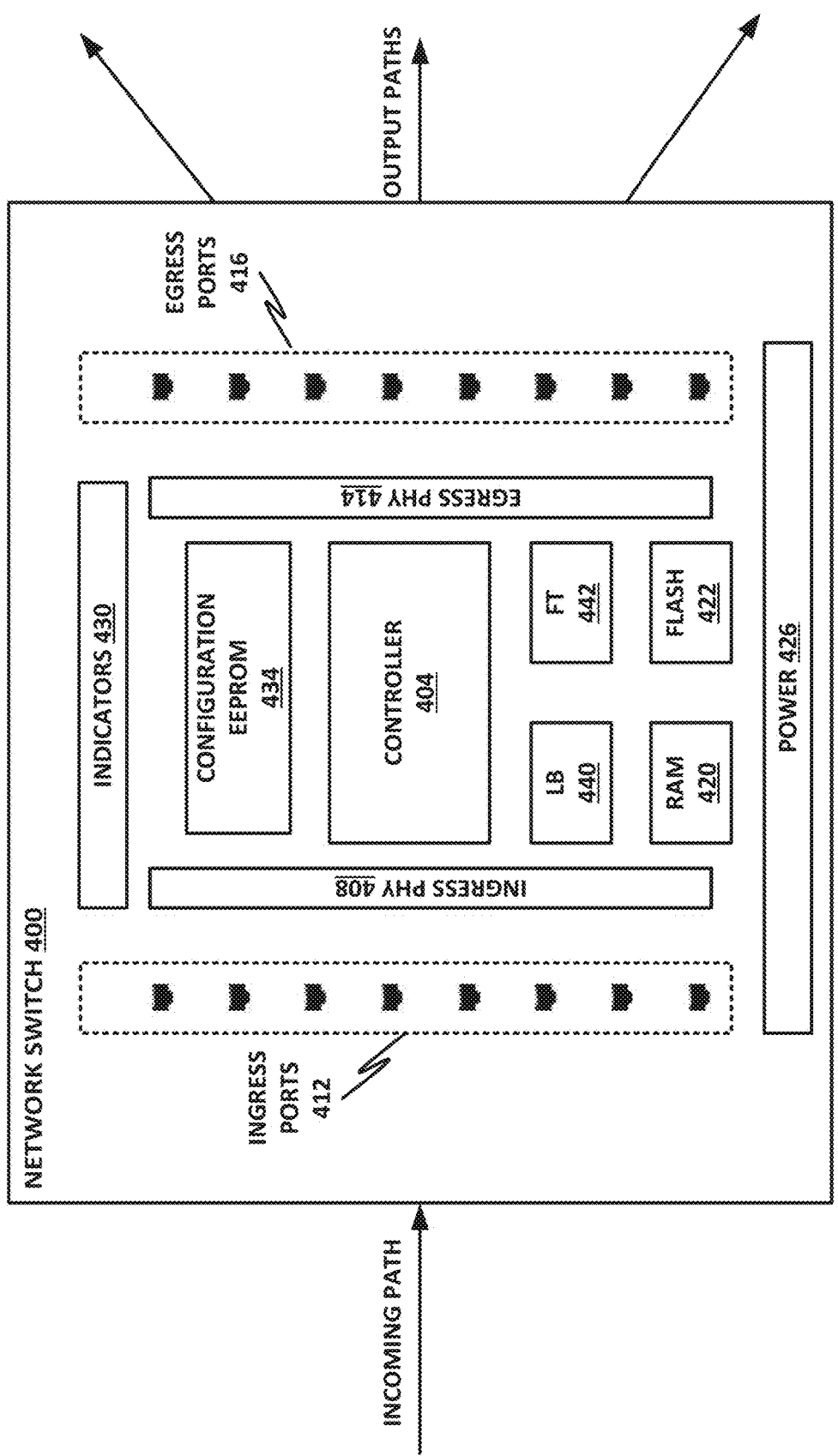
FIG. 4 is a block diagram of a network switch, according to one or more examples of the present specification.

FIG. 4 is a block diagram of a network switch 400, according to one or more examples of the present specification. Network switch 400 supports a load balancing protocol that realizes many of the advantages of both FGAR and LetFlow. For example, there is illustrated in FIG. 4 an input path, which network switch 400 is configured to load balance out to a plurality of output paths.

In this example, network switch 400 includes a plurality of ingress ports 412 serviced by an ingress phy 408. Network switch 400 also provides a plurality of egress ports 416 serviced by an egress phy 414. A controller 404 provides switching logic or a switching circuit to direct traffic from ingress ports 412 to egress ports 416. Controller 404 may be configured by a configuration EEPROM 434, and may also include random access memory 420, with non-transitory instructions stored on a flash 422. Switch 400 is powered by a power circuit 426. In some cases, indicators 430 such as LEDs or other human-visible indicators may be used to provide status information at a glance.

In practice, some packets at an ingress port 412 may be deterministically switched to an egress port 416, such as in the case where only a single route is provided for that packet. But in many practical cases, a plurality of egress ports 416 provides a plurality of equally valid routes for a packet arriving at an ingress port 412. Thus, load balancer 440 provides load balancing services, such as by selecting a non-random egress port 416 for a packet, according to an algorithm such as FGAR. Load balancer 440 may, in one example, direct packets according to a flow table 442. Similar to the LetFlow algorithm, load balancer 440 may identify the packet as the beginning of a new flowlet according to the methods described above, and may latch its decision for that packet to all new incoming packets that belong to the same flowlet. This is illustrated in greater detail in FIG. 5.

Figure 5:
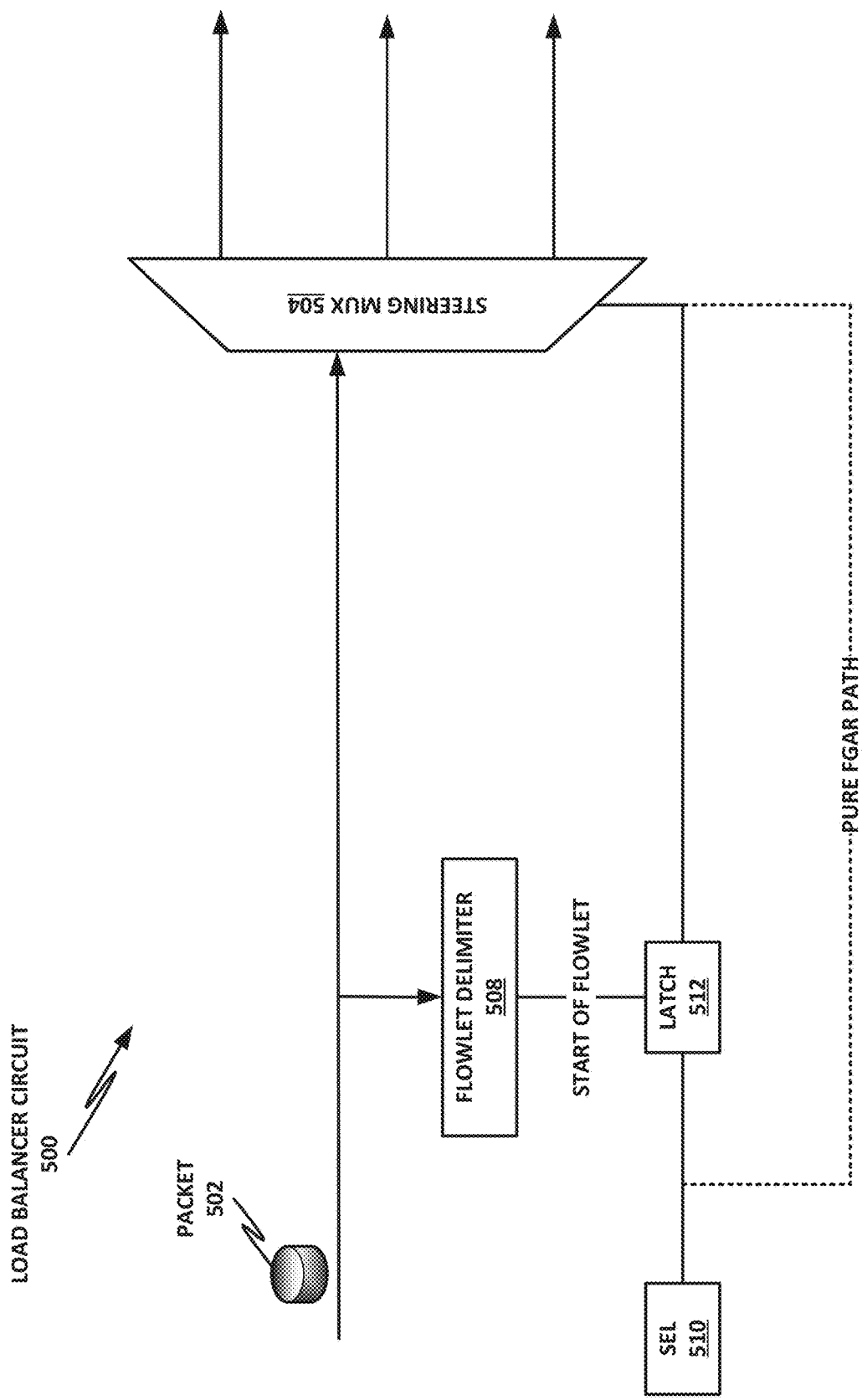
FIG. 5 is a schematic of a load balancer circuit, according to one or more examples of the present specification.

FIG. 5 is a schematic of a load balancer circuit 500, according to one or more examples of the present specification. FIG. 5 discloses a load balancer circuit 500. Note that in this FIGURE, a single load balancer circuit 500 is illustrated. But in practice, many simultaneous flows may be processed in a switching chip, with hardware support for detecting many flows and switching them appropriately. For simplicity of the illustration, only a single instance of load balancing is illustrated in load balancer circuit 500.

Load balancer circuit 500 may receive an incoming packet 502. Packet 502 is directed to a steering mux 504 which is controlled by a selector circuit 510. Steering mux 504 has a plurality of output paths to which packet 502 may be directed. Selector circuit 510 provides a selection input to steering mux 504, and steering mux 504 directs packet 502 to one of the output paths according to the selection input.

Selector circuit 510 may include an FGAR algorithm, or FGAR-like logic that selects an output path non-randomly, such as by identifying a least congested output path from among the plurality of available output paths. For illustration and contrast, a pure FGAR path is illustrated, showing that without the teachings of the present specification, selection circuit 510 could provide a per-packet selection of output paths. In some examples, a pure FGAR path may be an alternative embodiment, in which some packets or flows are latched while others are not. Congestion may also be determined based on factors such as history of congestion, the state or capabilities of network equipment, or the priority of a flow, by way of nonlimiting example.

In this embodiment, incoming packets are monitored by flowlet delimiter 508 (or other flowlet detector or identifier), which outputs a signal such as "start of flowlet" when it identifies the start of a new flowlet. Flowlet delimiter may, for example, identify a flowlet by first identifying a flow that the flowlet belongs to. When a first packet of the flow arrives, flowlet delimiter 508 identifies the first flowlet of the flowlet. Flowlet delimiter 508 may then time the arrival of incoming packets on the flow, with arrivals compared to a flowlet threshold. If the time since the last packet in the flow is greater than the flowlet delimiter may identify the packet as marking the first packet of a new flowlet.

The start of flowlet signal arrives at latch 512, which updates the instantaneous best path for the flowlet according to selector circuit 510, which may select the path according to, for example, FGAR best path information.

Latch 512 holds the selected best path for the flowlet until the start of the next flowlet is identified.

The result is that the entire flowlet is steered along the best path selected at its start. Because the path selection is held stable by latch 512 throughout the duration of the flowlet, the packets of the flowlet remain in order, thus realizing one of the benefits of the LetFlow algorithm. However, unlike LetFlow, but like FGAR, the selection of the preferred path is not random, but is driven by path selection logic such as FGAR.

In contrast, a pure FGAR method does not latch the best path, and instead uses the current favored path for each individual packet, selected independently of each other packet. While this provides good theoretical load balancing and congestion avoidance, it creates severe reordering that is incompatible with many protocols, particularly outside of the HPC space.

Note that while FGAR is illustrated as an example algorithm for selecting an instantaneous best output path from steering mux 504, FGAR is not required. FGAR is merely one of a plurality of available algorithms for selecting a best path among the available alternative paths to a flow's destination. FGAR specifically determines the best path according to current congestion as known by the switch. It is, however, possible to build a selector circuit 510 that does not support FGAR, but rather supports some other non-random selection logic. Indeed, in a purely TCP environment, FGAR may be ill-suited to that protocol, and it may be advantageous to select some protocol other than FGAR.

Similarly, while LetFlow is illustrated as a mechanism for identifying and grouping flowlets, the LetFlow algorithm is not necessary to the present specification. Rather, LetFlow is illustrated as an embodiment of an algorithm that identifies individual flowlets and latches the decision for that flowlet so that packets within the flowlet are all directed to the same path.

In particular, the LetFlow publication identifies a fixed time based method for identifying flowlets. But in the more general case, flowlet delimiter 508 may use any flowlet detection algorithm that results in minimal reordering of packets at the destination.

Figure 6:
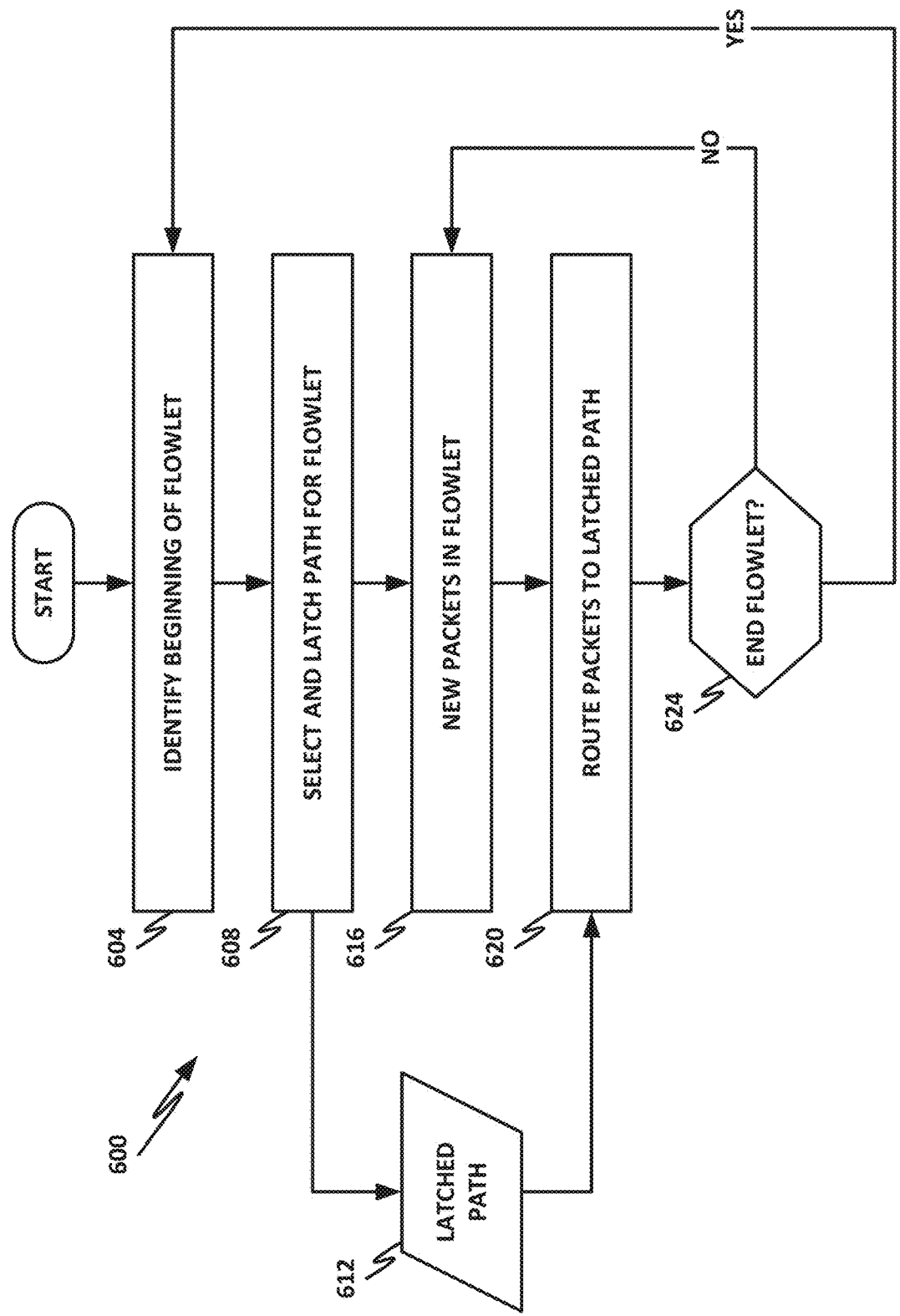
FIG. 6 is a flowchart of a method of performing load balancing, according to one or more examples of the present specification.

FIG. 6 is a flowchart of a method 600 of performing load balancing, according to one or more examples of the present specification.

In block 604, the load balancing circuit identifies the beginning of a flowlet. For example, in the LetFlow algorithm, the beginning of a flowlet is identified by inspecting the valid bit of a header that matches the packet in a LetFlow table. If the valid bit is set, then the packet belongs to an existing flowlet. But if the valid bit is cleared, then the packet represents the beginning of a new flowlet, and the valid bit may be set, while the age bit is cleared.

In block 608, a selector selects the best path for the flowlet and latches the decision for that path for the duration of the flowlet, resulting in latched path 612. Selection of a "best path" for a particular flowlet may depend on the application, and may use FGAR or some other algorithm.

In block 616, the system receives new packets that belong to the same flowlet, and identifies them as belonging to the flowlet. For example, in a LetFlow-like algorithm, packets belonging to the flowlet are identified by hashing their 5-tuple header and using the hash as an index into a LetFlow table. Matching packets are inspected, and the valid and age bits of the flowlet are inspected to determine whether a new flowlet should be started.

As long as the packets belong to the same flowlet, then in block 620, the packets are routed according to latched path 612.

In decision block 624, the system determines whether the end of the flowlet has been reached.

If the end of the flowlet has not been reached, then returning the block 616, new packets are received, processed, and directed through the latched path until the end of the flowlet is reached.

Returning to block 624, when the end of the flowlet is reached, then system may optionally "unlatch" the selected path. Control then returns to block 604, where the system finds the beginning of a new flowlet.

Figure 7:
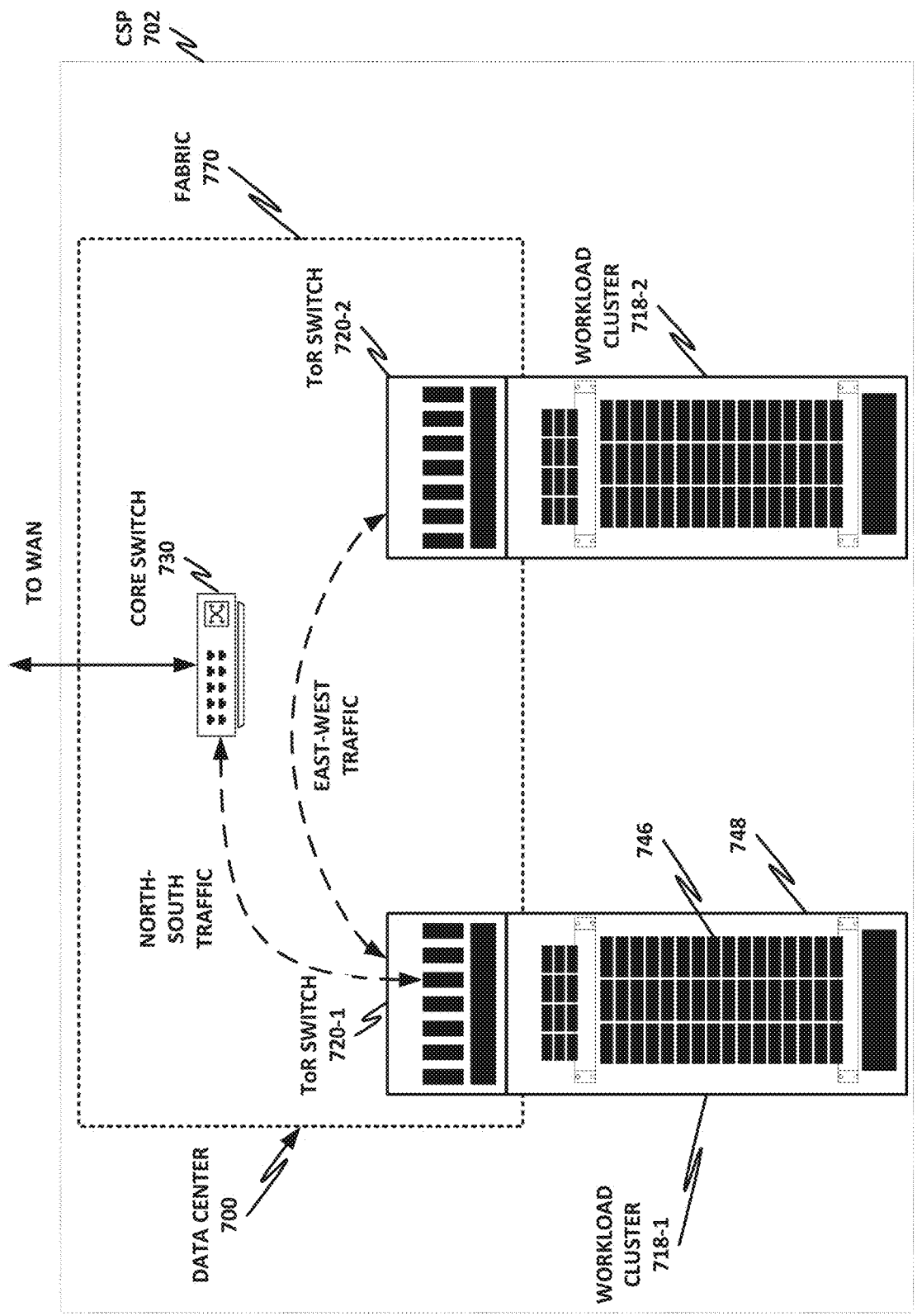
FIG. 7 is a block diagram of selected components of a data center with connectivity to a network of a cloud service provider, according to one or more examples of the present application.

FIG. 7 is a block diagram of selected components of a data center 700 with connectivity to a network of a cloud service provider (CSP) 702, according to one or more examples of the present specification. Embodiments of data center 700 disclosed herein may be adapted or configured to provide the method of non-random flowlet-based routing according to the teachings of the present specification. CSP 702 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 702 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 702 may provision some number of workload clusters 718, which may be clusters of individual servers, blade servers, rackmount servers, or any other suitable server topology. In this illustrative example, two workload clusters, 718-1 and 718-2 are shown, each providing rackmount servers 746 in a chassis 748.

In this illustration, workload clusters 718 are shown as modular workload clusters conforming to the rack unit ("U") standard, in which a standard rack, 19 inches wide, may be built to accommodate 42 units (42 U), each 1.75 inches high and approximately 36 inches deep. In this case, compute resources such as processors, memory, storage, accelerators, and switches may fit into some multiple of rack units from one to 42.

Figure 11:
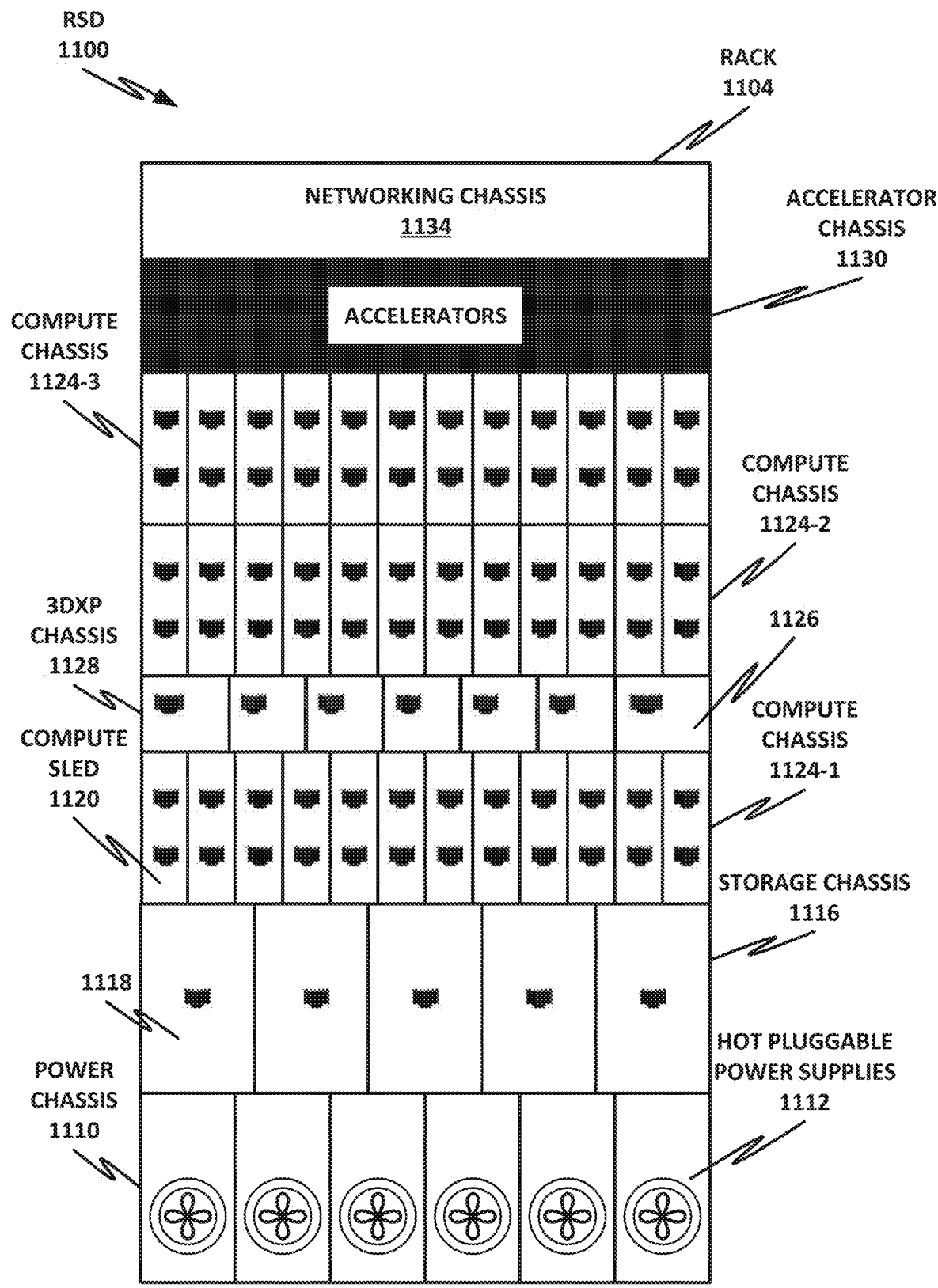
FIG. 11 is a block diagram of rack scale design (RSD), according to one or more examples of the present specification.

However, other embodiments are also contemplated. For example, FIG. 11 illustrates rack scale design (RSD). In RSD, a rack may be built according to the standard 42 U dimensions, but it may be configured to accommodate line-replaceable units (LRUs) in compute "sleds." In RSD, a sled chassis may or may not be built according to standard rack units. For example, a sled to accommodate processors may fit in a standard 3 U configuration, or it may be of an arbitrary size according to preferential design considerations. In RSD, entire pre-populated racks of resources may be provided as a unit, with the rack hosting a plurality of resource sleds, containing such elements as compute (e.g., processors), memory, storage, accelerators, power, networking, and others. Each sled chassis may accommodate a number of LRUs, each embodied in an individual sled. If a resource fails, the LRU hosting that resource can be pulled, and a new one can be modularly inserted. The failed LRU can then be repaired or discarded, depending on the nature of the failure. RSD is especially, though not exclusively, beneficial in the case of software-defined infrastructure (SDI), wherein composite nodes may be built from disaggregated resources. Large resource pools can be provided, and an SDI orchestrator may allocate them to composite nodes as necessary.

Each server 746 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 746 may be specifically dedicated to certain enterprise clients or tenants, while others may be shared.

The various devices in a data center may be connected to each other via a switching fabric 770, which may include one or more high speed routing and/or switching devices. Switching fabric 770 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 746 increases, traffic volume may further increase. For example, each server 746 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 770 may be provided. Switching fabric 770 is illustrated in this example as a "flat" network, wherein each server 746 may have a direct connection to a top-of-rack (ToR) switch 720 (e.g., a "star" configuration), and each ToR switch 720 may couple to a core switch 730. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 746 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 770. In other embodiments, the Ultra Path Interconnect (UPI) (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 720, and optical cabling provides relatively longer connections to core switch 730. Interconnect technologies that may be found in the data center include, by way of nonlimiting example, Intel® Omni-Path™ Architecture (OPA), TrueScale™, UPI (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in HPC applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 770 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 770.

In certain embodiments, fabric 770 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 8:
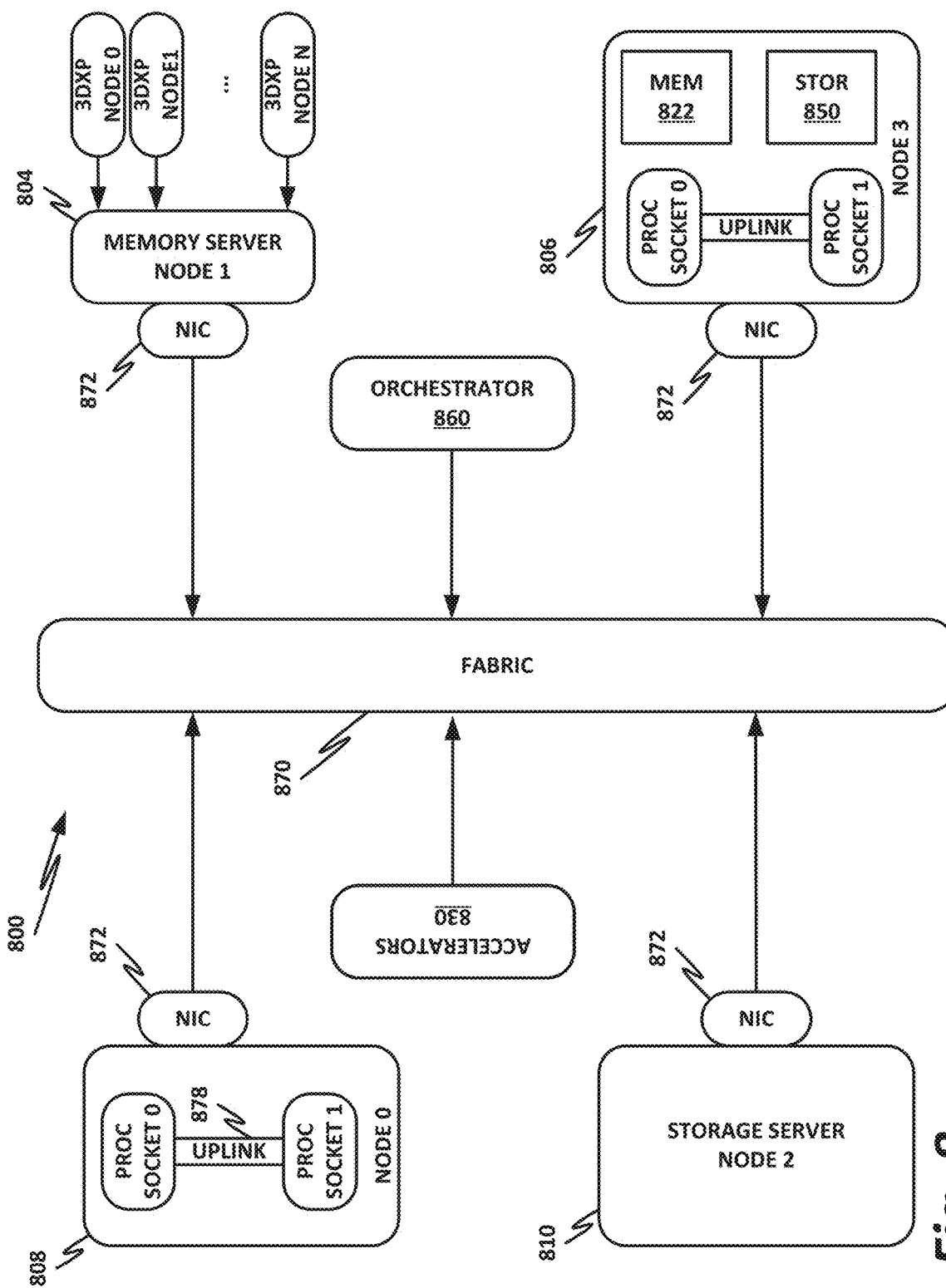
FIG. 8 is a block diagram of selected components of an end user computing device, according to one or more examples of the present specification.

FIG. 8 is a block diagram of an end user computing device 800, according to one or more examples of the present specification. Embodiments of computing device 800 disclosed herein may be adapted or configured to provide the method of non-random flowlet-based routing according to the teachings of the present specification. As above, computing device 800 may provide, as appropriate, cloud service, high-performance computing, telecommunication services, enterprise data center services, or any other compute services that benefit from a computing device 800.

In this example, a fabric 870 is provided to interconnect various aspects of computing device 800. Fabric 870 may be the same as fabric 770 of FIG. 7, or may be a different fabric. As above, fabric 870 may be provided by any suitable interconnect technology. In this example, Intel® Omni-Path™ is used as an illustrative and nonlimiting example.

As illustrated, computing device 800 includes a number of logic elements forming a plurality of nodes. It should be understood that each node may be provided by a physical server, a group of servers, or other hardware. Each server may be running one or more virtual machines as appropriate to its application.

Node 0 808 is a processing node including a processor socket 0 and processor socket 1. The processors may be, for example, Intel® Xeon™ processors with a plurality of cores, such as 4 or 8 cores. Node 0 808 may be configured to provide network or workload functions, such as by hosting a plurality of virtual machines or virtual appliances.

Onboard communication between processor socket 0 and processor socket 1 may be provided by an onboard uplink 878. This may provide a very high speed, short-length interconnect between the two processor sockets, so that virtual machines running on node 0 808 can communicate with one another at very high speeds. To facilitate this communication, a virtual switch (vSwitch) may be provisioned on node 0 808, which may be considered to be part of fabric 870.

Node 0 808 connects to fabric 870 via a NIC 872. NIC 872 may connect to an Ethernet fabric. Other embodiments may include an Intel® Omni-Path™ fabric, or any of the other fabrics discussed herein. In some examples, communication with fabric 870 may be tunneled, such as by providing UPI tunneling over Omni-Path™.

Because computing device 800 may provide many functions in a distributed fashion that in previous generations were provided onboard, a highly capable NIC 872 may be provided. NIC 872 may operate at speeds of multiple gigabits per second, and in some cases may be tightly coupled with node 0 808. For example, in some embodiments, the logic for NIC 872 is integrated directly with the processors on a system-on-a-chip. This provides very high speed communication between NIC 872 and the processor sockets, without the need for intermediary bus devices, which may introduce additional latency into the fabric.

However, this is not to imply that embodiments where NIC 872 is provided over a traditional bus are to be excluded. Rather, it is expressly anticipated that in some examples, NIC 872 may be provided on a bus, such as a PCIe bus, which is a serialized version of PCI that provides higher speeds than traditional PCI. Throughout computing device 800, various nodes may provide different types of HFIs 872, such as onboard HFIs and plug-in HFIs. It should also be noted that certain blocks in a system-on-a-chip may be provided as intellectual property (IP) blocks that can be "dropped" into an integrated circuit as a modular unit. Thus, NIC 872 may in some cases be derived from such an IP block.

Note that in "the network is the device" fashion, node 0 808 may provide limited or no onboard memory or storage. Rather, node 0 808 may rely primarily on distributed services, such as a memory server and a networked storage server. Onboard, node 0 808 may provide only sufficient memory and storage to bootstrap the device and get it communicating with fabric 870. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 804 and a node 2 storage server 810 provide the operational memory and storage capabilities of node 0 808. For example, memory server node 1 804 may provide remote direct memory access (RDMA), whereby node 0 808 may access memory resources on node 1 804 via fabric 870 in a direct memory access fashion, similar to how it would access its own onboard memory. The memory provided by memory server 804 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 808, a storage server node 2 810 may be provided. Storage server 810 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 808 may access memory from memory server 804 and store results on storage provided by storage server 810. Each of these devices couples to fabric 870 via a NIC 872, which provides fast communication that makes these technologies possible.

By way of further illustration, node 3 806 is also depicted. Node 3 806 also includes a NIC 872, along with two processor sockets internally connected by an uplink. However, unlike node 0 808, node 3 806 includes its own onboard memory 822 and storage 850. Thus, node 3 806 may be configured to perform its functions primarily onboard, and may not be required to rely upon memory server 804 and storage server 810. However, in appropriate circumstances, node 3 806 may supplement its own onboard memory 822 and storage 850 with distributed resources similar to node 0 808.

Computing device 800 may also include accelerators 830. These may provide various accelerated functions, including hardware or co-processor acceleration for functions such as packet processing, encryption, decryption, compression, decompression, network security, or other accelerated functions in the data center. In some examples, accelerators 830 may include deep learning accelerators that may be directly attached to one or more cores in nodes such as node 0 808 or node 3 806. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, field-programmable gate array (FPGA), co-processor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

Figure 9:
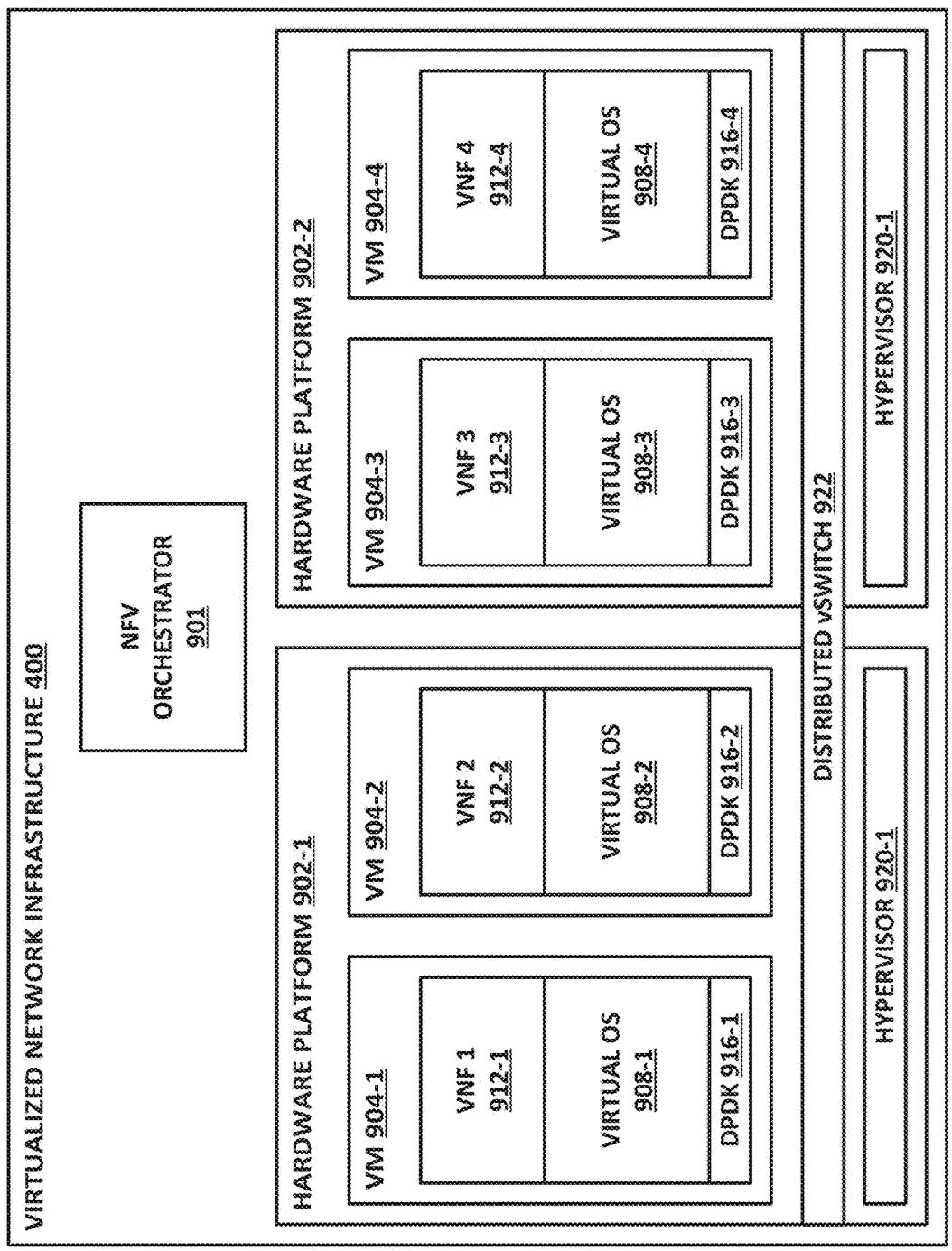
FIG. 9 is a block diagram of a network function virtualization (NFV) architecture, according to one or more examples of the present specification.

FIG. 9 is a block diagram of a network function virtualization (NFV) infrastructure 900 according to one or more examples of the present specification. Embodiments of NFV infrastructure 900 disclosed herein may be adapted or configured to provide the method of non-random flowlet-based routing according to the teachings of the present specification.

NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. In other words, certain portions of the network may rely on SDN, while other portions (or the same portions) may rely on NFV.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DVDK), a virtual operating system 908, and an application providing the VNF 912.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This figure does not necessarily illustrate any relationship between the VNFs and the larger network, or the packet flows that NFVI 900 may employ.

The illustrated Data Plane Development Kit DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., an HFI). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

Figure 10:
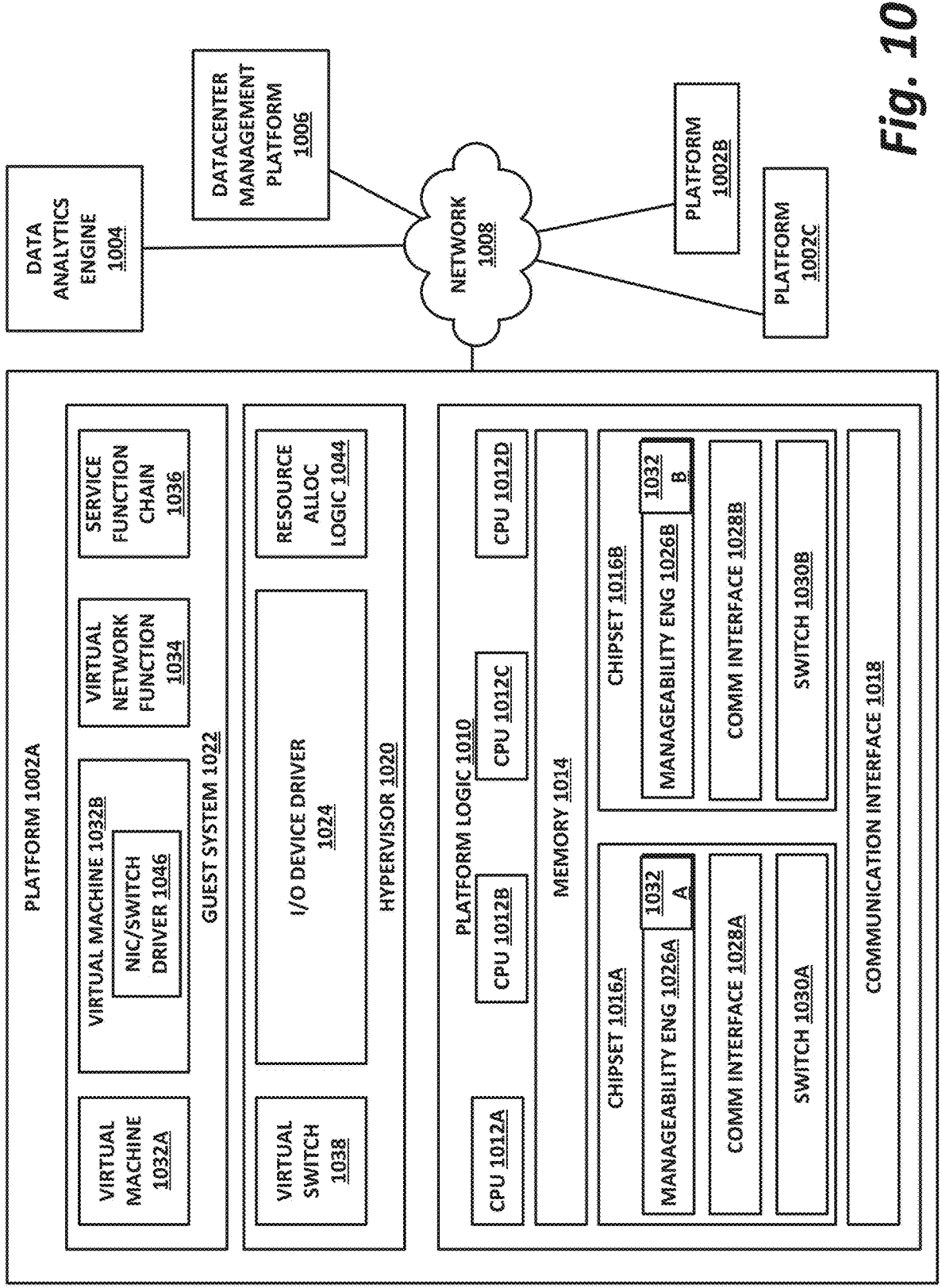
FIG. 10 is a block diagram of components of a computing platform, according to one or more examples of the present specification.

FIG. 10 is a block diagram of components of a computing platform 1002A according to one or more examples of the present specification. Embodiments of computing platform 1002A disclosed herein may be adapted or configured to provide the method of non-random flowlet-based routing according to the teachings of the present specification.

In the embodiment depicted, platforms 1002A, 1002B, and 1002C, along with a data center management platform 1006 and data analytics engine 1004 are interconnected via network 1008. In other embodiments, a computer system may include any suitable number of (i.e., one or more) platforms. In some embodiments (e.g., when a computer system only includes a single platform), all or a portion of the system management platform 1006 may be included on a platform 1002. A platform 1002 may include platform logic 1010 with one or more central processing units (CPUs) 1012, memories 1014 (which may include any number of different modules), chipsets 1016, communication interfaces 1018, and any other suitable hardware and/or software to execute a hypervisor 1020 or other operating system capable of executing workloads associated with applications running on platform 1002. In some embodiments, a platform 1002 may function as a host platform for one or more guest systems 1022 that invoke these applications. Platform 1002A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1006, hypervisor 1020, or other operating system) of computer platform 1002A may assign hardware resources of platform logic 1010 to perform workloads in accordance with the stress information. In some embodiments, self-diagnostic capabilities may be combined with the stress monitoring to more accurately determine the health of the hardware resources. Each platform 1002 may include platform logic 1010. Platform logic 1010 comprises, among other logic enabling the functionality of platform 1002, one or more CPUs 1012, memory 1014, one or more chipsets 1016, and communication interfaces 1028. Although three platforms are illustrated, computer platform 1002A may be interconnected with any suitable number of platforms. In various embodiments, a platform 1002 may reside on a circuit board that is installed in a chassis, rack, or other suitable structure that comprises multiple platforms coupled together through network 1008 (which may comprise, e.g., a rack or backplane switch).

CPUs 1012 may each comprise any suitable number of processor cores and supporting logic (e.g., uncores). The cores may be coupled to each other, to memory 1014, to at least one chipset 1016, and/or to a communication interface 1018, through one or more controllers residing on CPU 1012 and/or chipset 1016. In particular embodiments, a CPU 1012 is embodied within a socket that is permanently or removably coupled to platform 1002A. Although four CPUs are shown, a platform 1002 may include any suitable number of CPUs.

Memory 1014 may comprise any form of volatile or nonvolatile memory including, without limitation, magnetic media (e.g., one or more tape drives), optical media, random access memory (RAM), ROM, flash memory, removable media, or any other suitable local or remote memory component or components. Memory 1014 may be used for short, medium, and/or long term storage by platform 1002A. Memory 1014 may store any suitable data or information utilized by platform logic 1010, including software embedded in a computer-readable medium, and/or encoded logic incorporated in hardware or otherwise stored (e.g., firmware). Memory 1014 may store data that is used by cores of CPUs 1012. In some embodiments, memory 1014 may also comprise storage for instructions that may be executed by the cores of CPUs 1012 or other processing elements (e.g., logic resident on chipsets 1016) to provide functionality associated with the manageability engine 1026 or other components of platform logic 1010. A platform 1002 may also include one or more chipsets 1016 comprising any suitable logic to support the operation of the CPUs 1012. In various embodiments, chipset 1016 may reside on the same die or package as a CPU 1012 or on one or more different dies or packages. Each chipset may support any suitable number of CPUs 1012. A chipset 1016 may also include one or more controllers to couple other components of platform logic 1010 (e.g., communication interface 1018 or memory 1014) to one or more CPUs. In the embodiment depicted, each chipset 1016 also includes a manageability engine 1026. Manageability engine 1026 may include any suitable logic to support the operation of chipset 1016. In a particular embodiment, a manageability engine 1026 (which may also be referred to as an innovation engine) is capable of collecting real-time telemetry data from the chipset 1016, the CPU(s) 1012 and/or memory 1014 managed by the chipset 1016, other components of platform logic 1010, and/or various connections between components of platform logic 1010. In various embodiments, the telemetry data collected includes the stress information described herein.

In various embodiments, a manageability engine 1026 operates as an out-of-band asynchronous compute agent which is capable of interfacing with the various elements of platform logic 1010 to collect telemetry data with no or minimal disruption to running processes on CPUs 1012. For example, manageability engine 1026 may comprise a dedicated processing element (e.g., a processor, controller, or other logic) on chipset 1016, which provides the functionality of manageability engine 1026 (e.g., by executing software instructions), thus conserving processing cycles of CPUs 1012 for operations associated with the workloads performed by the platform logic 1010. Moreover the dedicated logic for the manageability engine 1026 may operate asynchronously with respect to the CPUs 1012 and may gather at least some of the telemetry data without increasing the load on the CPUs.

A manageability engine 1026 may process telemetry data it collects (specific examples of the processing of stress information are provided herein). In various embodiments, manageability engine 1026 reports the data it collects and/or the results of its processing to other elements in the computer system, such as one or more hypervisors 1020 or other operating systems and/or system management software (which may run on any suitable logic such as system management platform 1006). In particular embodiments, a critical event such as a core that has accumulated an excessive amount of stress may be reported prior to the normal interval for reporting telemetry data (e.g., a notification may be sent immediately upon detection).

Additionally, manageability engine 1026 may include programmable code configurable to set which CPU(s) 1012 a particular chipset 1016 manages and/or which telemetry data may be collected.

Chipsets 1016 also each include a communication interface 1028. Communication interface 1028 may be used for the communication of signaling and/or data between chipset 1016 and one or more I/O devices, one or more networks 1008, and/or one or more devices coupled to network 1008 (e.g., system management platform 1006). For example, communication interface 1028 may be used to send and receive network traffic such as data packets. In a particular embodiment, a communication interface 1028 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1016 (e.g., manageability engine 1026 or switch 1030) and another device coupled to network 1008. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1028 may allow communication of data (e.g., between the manageability engine 1026 and the data center management platform 1006) associated with management and monitoring functions performed by manageability engine 1026. In various embodiments, manageability engine 1026 may utilize elements (e.g., one or more NICs) of communication interfaces 1028 to report the telemetry data (e.g., to system management platform 1006) in order to reserve usage of NICs of communication interface 1018 for operations associated with workloads performed by platform logic 1010.

Switches 1030 may couple to various ports (e.g., provided by NICs) of communication interface 1028 and may switch data between these ports and various components of chipset 1016 (e.g., one or more Peripheral Component Interconnect Express (PCIe) lanes coupled to CPUs 1012). Switches 1030 may be a physical or virtual (i.e., software) switch.

Platform logic 1010 may include an additional communication interface 1018. Similar to communication interfaces 1028, communication interfaces 1018 may be used for the communication of signaling and/or data between platform logic 1010 and one or more networks 1008 and one or more devices coupled to the network 1008. For example, communication interface 1018 may be used to send and receive network traffic such as data packets. In a particular embodiment, communication interfaces 1018 comprise one or more physical NICs. These NICs may enable communication between any suitable element of platform logic 1010 (e.g., CPUs 1012 or memory 1014) and another device coupled to network 1008 (e.g., elements of other platforms or remote computing devices coupled to network 1008 through one or more networks).

Platform logic 1010 may receive and perform any suitable types of workloads. A workload may include any request to utilize one or more resources of platform logic 1010, such as one or more cores or associated logic. For example, a workload may comprise a request to instantiate a software component, such as an I/O device driver 1024 or guest system 1022; a request to process a network packet received from a virtual machine 1032 or device external to platform 1002A (such as a network node coupled to network 1008); a request to execute a process or thread associated with a guest system 1022, an application running on platform 1002A, a hypervisor 1020 or other operating system running on platform 1002A; or other suitable processing request.

A virtual machine 1032 may emulate a computer system with its own dedicated hardware. A virtual machine 1032 may run a guest operating system on top of the hypervisor 1020. The components of platform logic 1010 (e.g., CPUs 1012, memory 1014, chipset 1016, and communication interface 1018) may be virtualized such that it appears to the guest operating system that the virtual machine 1032 has its own dedicated components.

A virtual machine 1032 may include a virtualized NIC (vNIC), which is used by the virtual machine as its network interface. A vNIC may be assigned a media access control (MAC) address or other identifier, thus allowing multiple virtual machines 1032 to be individually addressable in a network.

VNF 1034 may comprise a software implementation of a functional building block with defined interfaces and behavior that can be deployed in a virtualized infrastructure. In particular embodiments, a VNF 1034 may include one or more virtual machines 1032 that collectively provide specific functionalities (e.g., WAN optimization, virtual private network (VPN) termination, firewall operations, load balancing operations, security functions, etc.). A VNF 1034 running on platform logic 1010 may provide the same functionality as traditional network components implemented through dedicated hardware. For example, a VNF 1034 may include components to perform any suitable NFV workloads, such as virtualized evolved packet core (vEPC) components, mobility management entities, 3rd Generation Partnership Project (3GPP) control and data plane components, etc.

SFC 1036 is a group of VNFs 1034 organized as a chain to perform a series of operations, such as network packet processing operations. Service function chaining may provide the ability to define an ordered list of network services (e.g. firewalls, load balancers) that are stitched together in the network to create a service chain.

A hypervisor 1020 (also known as a virtual machine monitor) may comprise logic to create and run guest systems 1022. The hypervisor 1020 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1010. Services of hypervisor 1020 may be provided by virtualizing in software or through hardware assisted resources that require minimal software intervention, or both. Multiple instances of a variety of guest operating systems may be managed by the hypervisor 1020. Each platform 1002 may have a separate instantiation of a hypervisor 1020.

Hypervisor 1020 may be a native or bare metal hypervisor that runs directly on platform logic 1010 to control the platform logic and manage the guest operating systems. Alternatively, hypervisor 1020 may be a hosted hypervisor that runs on a host operating system and abstracts the guest operating systems from the host operating system. Hypervisor 1020 may include a virtual switch 1038 that may provide virtual switching and/or routing functions to virtual machines of guest systems 1022. The virtual switch 1038 may comprise a logical switching fabric that couples the vNICs of the virtual machines 1032 to each other, thus creating a virtual network through which virtual machines may communicate with each other.

Virtual switch 1038 may comprise a software element that is executed using components of platform logic 1010. In various embodiments, hypervisor 1020 may be in communication with any suitable entity (e.g., a SDN controller) which may cause hypervisor 1020 to reconfigure the parameters of virtual switch 1038 in response to changing conditions in platform 1002 (e.g., the addition or deletion of virtual machines 1032 or identification of optimizations that may be made to enhance performance of the platform).

Hypervisor 1020 may also include resource allocation logic 1044, which may include logic for determining allocation of platform resources based on the telemetry data (which may include stress information). Resource allocation logic 1044 may also include logic for communicating with various components of platform logic 1010 entities of platform 1002A to implement such optimization, such as components of platform logic 1010.

Any suitable logic may make one or more of these optimization decisions. For example, system management platform 1006; resource allocation logic 1044 of hypervisor 1020 or other operating system; or other logic of computer platform 1002A may be capable of making such decisions. In various embodiments, the system management platform 1006 may receive telemetry data from and manage workload placement across multiple platforms 1002. The system management platform 1006 may communicate with hypervisors 1020 (e.g., in an out-of-band manner) or other operating systems of the various platforms 1002 to implement workload placements directed by the system management platform.

The elements of platform logic 1010 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 1002A may be coupled together in any suitable manner such as through one or more networks 1008. A network 1008 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

FIG. 11 is a block diagram of a rack scale design (RSD) 1100 according to one or more examples of the present specification. Embodiments of RSD 1100 disclosed herein may be adapted or configured to provide the method of non-random flowlet-based routing according to the teachings of the present specification.

In this example, RSD 1100 includes a single rack 1104, to illustrate certain principles of RSD. It should be understood that RSD 1100 may include many such racks, and that the racks need not be identical to one another. In some cases a multipurpose rack such as rack 1104 may be provided, while in other examples, single-purpose racks may be provided. For example, rack 1104 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 1104 of FIG. 11 should be understood to be a nonlimiting example of a rack that may be used in an RSD 1100.

In the example of FIG. 11, rack 1104 may be a standard rack with an external width of approximately 23.6 inches and a height of 78.74 inches. In common usage, this is referred to as a "42 U rack." However, rack 1104 need not conform to the "rack unit" standard. Rather, rack 1104 may include a number of chassis that are optimized for their purposes.

Rack 1104 may be marketed and sold as a monolithic unit, with a number of LRUs within each chassis. The LRUs in this case may be sleds, and thus can be easily swapped out when a replacement needs to be made.

In this example, rack 1104 includes a power chassis 1110, a storage chassis 1116, three compute chassis (1124-1, 1124-2, and 1124-3), a 3-D Crosspoint™ (3DXP) chassis 1128, an accelerator chassis 1130, and a networking chassis 1134. Each chassis may include one or more LRU sleds holding the appropriate resources. For example, power chassis 1110 includes a number of hot pluggable power supplies 1112, which may provide shared power to rack 1104. In other embodiments, some sled chassis may also include their own power supplies, depending on the needs of the embodiment.

Storage chassis 1116 includes a number of storage sleds 1118. Compute chassis 1124 each contain a number of compute sleds 1120. 3DXP chassis 1128 may include a number of 3DXP sleds 1126, each hosting a 3DXP memory server. And accelerator chassis 1130 may host a number of accelerators, such as Intel® Quick Assist™ technology (QAT), FPGAs, ASICs, or other accelerators of the same or different types. Accelerators within accelerator chassis 1130 may be the same type or of different types according to the needs of a particular embodiment.

Over time, the various LRUs within rack 1104 may become damaged, outdated, or may experience functional errors. As this happens, LRUs may be pulled and replaced with compatible LRUs, thus allowing the rack to continue full scale operation.

Figure 12:
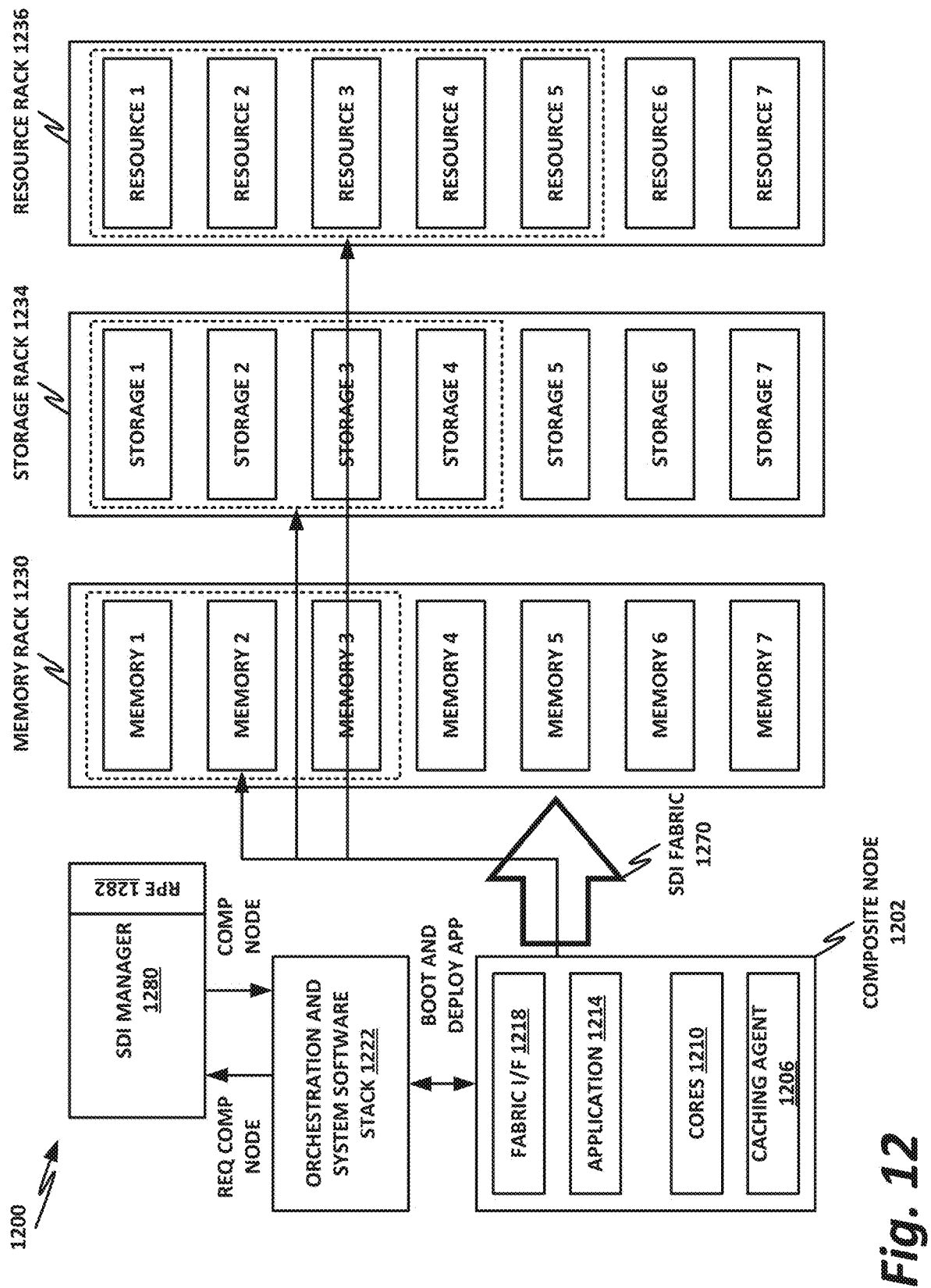
FIG. 12 is a block diagram of a software-defined infrastructure (SDI) data center, according to one or more examples of the present specification.

FIG. 12 is a block diagram of a software-defined infrastructure (SDI) data center 1200, according to one or more examples of the present specification. Embodiments of SDI data center 1200 disclosed herein may be adapted or configured to provide the method of non-random flowlet-based routing according to the teachings of the present specification. Certain applications hosted within SDI data center 1200 may employ a set of resources to achieve their designated purposes, such as processing database queries, serving web pages, or providing computer intelligence.

Certain applications tend to be sensitive to a particular subset of resources. For example, SAP HANA is an in-memory, column-oriented relational database system. A SAP HANA database may use processors, memory, disk, and fabric, while being most sensitive to memory and processors. In one embodiment, composite node 1202 includes one or more cores 1210 that perform the processing function. Node 1202 may also include caching agents 1206 that provide access to high speed cache. One or more applications 1214 run on node 1202, and communicate with the SDI fabric via FA 1218. Dynamically provisioning resources to node 1202 may include selecting a set of resources and ensuring that the quantities and qualities provided meet required performance indicators, such as SLAs and quality of service (QoS). Resource selection and allocation for application 1214 may be performed by a resource manager, which may be implemented within orchestration and system software stack 1222. By way of nonlimiting example, throughout this specification the resource manager may be treated as though it can be implemented separately or by an orchestrator. Note that many different configurations are possible.

In an SDI data center, applications may be executed by a composite node such as node 1202 that is dynamically allocated by SDI manager 1280. Such nodes are referred to as composite nodes because they are not nodes where all of the resources are necessarily collocated. Rather, they may include resources that are distributed in different parts of the data center, dynamically allocated, and virtualized to the specific application 1214.

In this example, memory resources from three memory sleds from memory rack 1230 are allocated to node 1202, storage resources from four storage sleds from storage rack 1234 are allocated, and additional resources from five resource sleds from resource rack 1236 are allocated to application 1214 running on composite node 1202. All of these resources may be associated to a particular compute sled and aggregated to create the composite node. Once the composite node is created, the operating system may be booted in node 1202, and the application may start running using the aggregated resources as if they were physically collocated resources. As described above, FA 1218 may provide certain interfaces that enable this operation to occur seamlessly with respect to node 1202.

As a general proposition, the more memory and compute resources that are added to a database processor, the better throughput it can achieve. However, this is not necessarily true for the disk or fabric. Adding more disk and fabric bandwidth may not necessarily increase the performance of the SAP HANA database beyond a certain threshold.

SDI data center 1200 may address the scaling of resources by mapping an appropriate amount of offboard resources to the application based on application requirements provided by a user or network administrator or directly by the application itself. This may include allocating resources from various resource racks, such as memory rack 1230, storage rack 1234, and resource rack 1236.

In an example, SDI controller 1280 also includes a resource protection engine (RPE) 1282, which is configured to assign permission for various target resources to disaggregated compute resources (DRCs) that are permitted to access them. In this example, the resources are expected to be enforced by an FA servicing the target resource.

In certain embodiments, elements of SDI data center 1200 may be adapted or configured to operate with the disaggregated telemetry model of the present specification.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a network switch, comprising: an ingress port and a plurality of egress ports to provide a plurality of paths for a packet; a switching circuit to provide network switching; circuitry to identify the start of a flowlet; circuitry to select a non-random path for the flowlet; circuitry to latch the selected path for the flowlet; and a load balancer to receive a packet, match the packet to the flowlet, and direct the packet to the selected path.

Example 2 includes the network switch of example 1, wherein selecting a non-random path for the flowlet comprises selecting a least-congested path from among the plurality of paths.

Example 3 includes the network switch of example 2, wherein selecting the least congested path comprises selecting the path according to a fine grained adaptive routing (FGAR) method.

Example 4 includes the network switch of example 3, wherein the FGAR is configured to select a least congested path from among a plurality of available paths.

Example 5 includes the network switch of example 1, wherein identifying the start of the flowlet comprises identifying a first burst of packets in a flow and determining that the first burst of packets are sufficiently temporally removed from a second burst of packets that the first and second burst of packets can be transmitted along separate network paths without resulting in substantial reordering.

Example 6 includes the network switch of example 1, wherein identifying the start of the flowlet comprises identifying the start of the flowlet according to a LetFlow algorithm.

Example 7 includes the network switch of example 6, wherein identifying the start of the flowlet comprises matching the packet to an entry for the flowlet in a flowlet table, determining that a valid bit of the entry is set, and assigning the packet to the flowlet.

Example 8 includes the network switch of example 7, wherein matching the packet to the entry comprises matching a 5-tuple of a header of the packet to the flowlet entry.

Example 9 includes the network switch of example 1, wherein the load balancing circuit is further to identify the start of a next flowlet and to unlatch the selected path.

Example 10 includes the network switch of example 9, wherein identifying the start of the next flowlet comprises populating an entry in a flowlet table with a port number, a valid bit, and an age bit, and after a time limit A, examining the flow table, determining that the valid bit is set and the age bit is not set, clearing the valid bit, and setting the age bit.

Example 11 includes the network switch of example 1, wherein the packets are transmission control protocol (TCP) packets.

Example 12 includes the network switch of example 1, further comprising a plurality of flowlet delimiters and latches to provide load balancing for a plurality of flows.

Example 13 includes the network switch of example 1, wherein the path selector comprises a multiplexer, wherein the latch is to latch a selection input of the multiplexer.

Example 14 includes a load balancer circuit for a network switch, comprising: routing to communicatively couple to an ingress port and a plurality of egress ports; routing to communicatively couple to a switching circuit; a flowlet detection circuit to identify the start of a flowlet; a path selection circuit to adaptively select a non-congested path for the flowlet; a latching circuit to latch the selected path for the flowlet; and a path director circuit to receive a packet, match the packet to the flowlet, and direct the packet to the selected path.

Example 15 includes the load balancer circuit of example 14, wherein selecting a non-congested path for the flowlet comprises selecting a least-congested path from among the plurality of paths.

Example 16 includes the load balancer circuit of example 15, wherein selecting the least congested path comprises selecting the path according to a fine grained adaptive routing (FGAR) algorithm.

Example 17 includes the load balancer circuit of example 16, wherein the FGAR is configured to select a least congested path from among a plurality of available paths.

Example 18 includes the load balancer circuit of example 14, wherein identifying the start of the flowlet comprises identifying a first burst of packets in a flow and determining that the first burst of packets are sufficiently temporally removed from a second burst of packets that the first and second burst of packets can be transmitted along separate network paths without resulting in substantial reordering.

Example 19 includes the load balancer circuit of example 14, wherein identifying the start of the flowlet comprises identifying the start of the flowlet according to a LetFlow algorithm.

Example 20 includes the load balancer circuit of example 19, wherein identifying the start of the flowlet comprises matching the packet to an entry for the flowlet in a flowlet table, determining that a valid bit of the entry is set, and assigning the packet to the flowlet.

Example 21 includes the load balancer circuit of example 20, wherein matching the packet to the entry comprises matching a 5-tuple of a header of the packet to the flowlet entry.

Example 22 includes the load balancer circuit of example 14, wherein the load balancing circuit is further to identify the start of a next flowlet and to unlatch the selected path.

Example 23 includes the load balancer circuit of example 22, wherein identifying the start of the next flowlet comprises populating an entry in a flowlet table with a port number, a valid bit, and an age bit, and after a time limit A, examining the flow table, determining that the valid bit is set and the age bit is not set, clearing the valid bit, and setting the age bit.

Example 24 includes the load balancer circuit of example 14, wherein the packet is a transmission control protocol (TCP) packet.

Example 25 includes the load balancer circuit of example 14, further comprising a plurality of flowlet detection circuits and latching circuits to provide load balancing for a plurality of flows.

Example 26 includes the load balancer circuit of example 14, wherein the path director circuit comprises a multiplexer, wherein the latch is to latch a selection input of the multiplexer.

Example 27 includes an intellectual property (IP) block comprising the load balancer circuit of any of examples 14-26.

Example 28 includes an application-specific integrated circuit (ASIC) comprising the load balancer circuit of any of examples 14-26.

Example 29 includes a field-programmable gate array (FPGA) comprising the load balancer circuit of any of examples 14-26.

Example 30 includes a system comprising a programmable processor and instructions to implement the load balancer circuit of any of examples 14-26.

Example 31 includes one or more tangible, non-transitory storage mediums having stored thereon instructions or directives to provision or program a circuit to: communicatively couple to an ingress port and a plurality of egress ports; communicatively couple to switching logic; identify the start of a flowlet; adaptively select a non-random path for the flowlet; latch the selected path for the flowlet; and receive a packet; match the packet to the flowlet; and direct the packet to the selected path.

Example 32 includes the one or more tangible, non-transitory storage mediums of example 31, wherein selecting a non-congested path for the flowlet comprises selecting a least-congested path from among the plurality of paths.

Example 33 includes the one or more tangible, non-transitory storage mediums of example 32, wherein selecting the least congested path comprises selecting the path according to a fine grained adaptive routing (FGAR) algorithm.

Example 34 includes the one or more tangible, non-transitory storage mediums of example 33, wherein the FGAR is configured to select a least congested path from among a plurality of available paths.

Example 35 includes the one or more tangible, non-transitory storage mediums of example 31, wherein identifying the start of the flowlet comprises identifying a first burst of packets in a flow and determining that the first burst of packets are sufficiently temporally removed from a second burst of packets that the first and second burst of packets can be transmitted along separate network paths without resulting in substantial reordering.

Example 36 includes the one or more tangible, non-transitory storage mediums of example 31, wherein identifying the start of the flowlet comprises identifying the start of the flowlet according to a LetFlow algorithm.

Example 37 includes the one or more tangible, non-transitory storage mediums of example 36, wherein identifying the start of the flowlet comprises matching the packet to an entry for the flowlet in a flowlet table, determining that a valid bit of the entry is set, and assigning the packet to the flowlet.

Example 38 includes the one or more tangible, non-transitory storage mediums of example 37, wherein matching the packet to the entry comprises matching a 5-tuple of a header of the packet to the flowlet entry.

Example 39 includes the one or more tangible, non-transitory storage mediums of example 31, wherein the load balancing circuit is further to identify the start of a next flowlet and to unlatch the selected path.

Example 40 includes the one or more tangible, non-transitory storage mediums of example 39, wherein identifying the start of the next flowlet comprises populating an entry in a flowlet table with a port number, a valid bit, and an age bit, and after a time limit A, examining the flow table, determining that the valid bit is set and the age bit is not set, clearing the valid bit, and setting the age bit.

Example 41 includes the one or more tangible, non-transitory storage mediums of example 31, wherein the packet is a transmission control protocol (TCP) packets.

Example 42 includes the one or more tangible, non-transitory storage mediums of example 31, further comprising a plurality of flowlet detection circuits and latching circuits to provide load balancing for a plurality of flows.

Example 43 includes the one or more tangible, non-transitory storage mediums of example 31, wherein directing the packet to the selected path comprises latching the selected path to a selection input of a multiplexer.

Example 44 includes the one or more tangible, non-transitory storage mediums of any of examples 31-43, wherein the instructions comprise instructions to realize an intellectual property (IP) block.

Example 45 includes the one or more tangible, non-transitory storage mediums of any of examples 31-43, wherein the instructions comprise instructions to realize an application-specific integrated circuit (ASIC).

Example 46 includes the one or more tangible, non-transitory storage mediums of any of examples 31-43, wherein the instructions comprise instructions to realize a field-programmable gate array (FPGA).

Example 47 includes the one or more tangible, non-transitory storage mediums of any of examples 31-43, wherein the instructions comprise instructions to program a microprocessor.

Example 48 includes a method, implemented at least partly in hardware, of providing adaptive routing in a network, comprising: communicatively coupling to an ingress port and a plurality of egress ports; communicatively coupling to switching logic; identifying the start of a flowlet; adaptively selecting a non-random path for the flowlet; latching the selected path for the flowlet; and receiving a packet; matching the packet to the flowlet; and directing the packet to the selected path.

Example 49 includes the method of example 48, wherein selecting a non-random path for the flowlet comprises selecting a least-congested path from among the plurality of paths.

Example 50 includes the method of example 49, wherein selecting the least congested path comprises selecting the path according to a fine grained adaptive routing (FGAR) algorithm.

Example 51 includes the method of example 50, wherein the FGAR is configured to select a least congested path from among a plurality of available paths.

Example 52 includes the method of example 48, wherein identifying the start of the flowlet comprises identifying a first burst of packets in a flow and determining that the first burst of packets are sufficiently temporally removed from a second burst of packets that the first and second burst of packets can be transmitted along separate network paths without resulting in substantial reordering.

Example 53 includes the method of example 48, wherein identifying the start of the flowlet comprises identifying the start of the flowlet according to a LetFlow algorithm.

Example 54 includes the method of example 53, wherein identifying the start of the flowlet comprises matching the packet to an entry for the flowlet in a flowlet table, determining that a valid bit of the entry is set, and assigning the packet to the flowlet.

Example 55 includes the method of example 54, wherein matching the packet to the entry comprises matching a 5-tuple of a header of the packet to the flowlet entry.

Example 56 includes the method of example 48, wherein the load balancing circuit is further to identify the start of a next flowlet and to unlatch the selected path.

Example 57 includes the method of example 56, wherein identifying the start of the next flowlet comprises populating an entry in a flowlet table with a port number, a valid bit, and an age bit, and after a time limit A, examining the flow table, determining that the valid bit is set and the age bit is not set, clearing the valid bit, and setting the age bit.

Example 58 includes the method of example 48, wherein the packet is a transmission control protocol (TCP) packets.

Example 59 includes the method of example 48, further comprising a plurality of flowlet detection circuits and latching circuits to provide load balancing for a plurality of flows.

Example 60 includes the method of example 48, wherein directing the packet to the selected path comprises latching the selected path to a selection input of a multiplexer.

Example 61 includes an apparatus comprising means for performing the method of any of examples 48-60.

Example 62 includes the apparatus of example 61, wherein the means comprise a computing system comprising a processor and memory.

Example 63 includes the apparatus of example 61, wherein the means comprise a network switch.

Example 64 includes a network switch comprising a load balancer circuit to perform the method of any of examples 48-60.

Example 65 includes the network switch of example 64, wherein the load balancer circuit comprises a programmable processor.

Example 66 includes the network switch of example 64, wherein the load balancer circuit comprises a programmable co-processor.

Example 67 includes the network switch of example 64, wherein the load balancer circuit comprises an application-specific integrated circuit (ASIC).

Example 68 includes the network switch of example 64, wherein the load balancer circuit comprises a field-programmable gate array (FPGA).

What is claimed is:

1. A network switch, comprising:
an ingress port and a plurality of egress ports to provide a plurality of paths for packets;
a switching circuit to provide network switching; and
a load balancer circuit to include circuitry to:
identify a start of a flowlet based on identifying a packet of a flow, the flowlet to belong to the flow, and based on determining that a time since a directly preceding packet of the flow is greater than a period of time;
select a non-random path for the flowlet based on a measure of congestion of the plurality of paths;
hold the selected path for the flowlet; and
responsive to receipt of a packet, match the packet to the flowlet, and direct the packet to the selected path.

2. The network switch of claim 1, wherein the circuitry to select a non-random path for the flowlet based on the measure of congestion of the plurality of paths comprises the circuitry to select a least-congested path from among the plurality of paths.

3. The network switch of claim 2, wherein the circuitry to select the least congested path comprises the circuitry to select the least-congested path according to a fine grained adaptive routing (FGAR) method.

4. The network switch of claim 1, wherein the circuitry to identify the start of the flowlet further comprises the circuitry to identify the start of the flowlet according to a LetFlow algorithm.

5. The network switch of claim 4, wherein the circuitry to identify the start of the flowlet further comprises the circuitry to:
   match the packet to an entry for the flowlet in a flowlet table;
   determine that a valid bit of the entry is set; and
   assign the packet to the flowlet.

6. The network switch of claim 5, wherein the circuitry to match the packet to the entry further comprises the circuitry to match a 5-tuple of a header of the packet to the flowlet entry.

7. The network switch of claim 1, wherein the circuitry is further to:
   identify the start of a next flowlet; and
   remove the hold on the selected path.

8. The network switch of claim 1, comprising the circuitry further to:
   identify a start of a next flowlet, wherein to identify the start of the next flowlet includes the circuitry to:
      populate an entry in a flowlet table with a port number, a valid bit, and an age field, and after a time limit $\Delta$, examine the flowlet table, determine that the valid bit is set and the age field indicates the entry has not expired, clear the valid bit, and reset the age field.

9. The network switch of claim 1, wherein the packet is a transmission control protocol (TCP) packet.

10. The network switch of claim 1, the flowlet comprises a burst of packets of a given flow, wherein the burst of packets are to be directed to a same path to avoid packet reordering.

11. A load balancer circuit for a network switch, comprising:
   circuitry to:
      identify a start of a flowlet based on identifying a packet of a flow, the flowlet to belong to the flow, and based on determining that a time since a directly preceding packet of the flow is greater than a period of time;
      select a non-random path for the flowlet based on a measure of congestion of a plurality of paths coupled with egress ports of the network switch;
      hold the selected path for the flowlet; and
      responsive to receipt of a packet, match the packet to the flowlet, and direct the packet to the selected path.

12. The load balancer circuit of claim 11, wherein the circuitry to identify the start of the flowlet further comprises the circuitry to identify the start of the flowlet according to a LetFlow algorithm.

13. The load balancer circuit of claim 12, wherein the circuitry to identify the start of the flowlet further comprises the circuitry to:
   match the packet to an entry for the flowlet in a flowlet table;
   determine that a valid bit of the entry is set; and
   assign the packet to the flowlet.

14. The load balancer circuit of claim 11, wherein the packet is a transmission control protocol (TCP) packet.

15. An intellectual property (IP) block comprising the load balancer circuit of claim 11.

16. An application-specific integrated circuit (ASIC) comprising the load balancer circuit of claim 11.

17. A field-programmable gate array (FPGA) comprising the load balancer circuit of claim 11.

18. A system comprising a programmable processor and instructions to implement the load balancer circuit of claim 11.

19. A method comprising:
   identifying, by a load balancer circuit of a network switch, a start of a flowlet based on identifying a packet of a flow, the flowlet to belong to the flow, and based on determining that a time since a directly preceding packet of the flow is greater than a period of time;
   selecting a non-random path for the flowlet based on a measure of congestion of a plurality of paths coupled with egress ports of the network switch;
   holding the selected path for the flowlet;
   responsive to receipt of a packet, matching the packet to the flowlet; and
   directing the packet to the selected path.

20. The method of claim 19, wherein selecting a non-random path for the flowlet based on the measure of congestion of the plurality of paths comprises selecting a least-congested path from among the plurality of paths.

21. The method of claim 20, wherein selecting the least congested path further comprises selecting the least-congested path according to a fine grained adaptive routing (FGAR) algorithm.

22. The method of claim 19, wherein identifying the start of the flowlet further comprises identifying a first burst of packets in a flow and determining that the first burst of packets are sufficiently temporally removed from a second burst of packets that the first and second burst of packets can be transmitted along separate network paths without resulting in substantial reordering.

23. The load balancer circuit of claim 11, wherein the circuitry to select a non-random path for the flowlet based on the measure of congestion of the plurality of paths comprises the circuitry to select a least-congested path from among the plurality of paths.

24. The load balancer circuit of claim 23, wherein the circuitry to select the least congested path comprises the circuitry to select the least-congested path according to a fine grained adaptive routing (FGAR) algorithm.

* * * * *